(12) United States Patent
Kurihara et al.

(10) Patent No.: US 7,019,246 B2
(45) Date of Patent: Mar. 28, 2006

(54) CONTROLLER FOR WIRE ELECTRIC DISCHARGE MACHINE

(75) Inventors: Masaki Kurihara, Tokyo (JP); Kaoru Hiraga, Yamanashi (JP)

(73) Assignee: FANUC LTD, Yamanashi (JP)

( * ) Notice: Subject to any disclaimer, the term of this patent is extended or adjusted under 35 U.S.C. 154(b) by 0 days.

(21) Appl. No.: 11/195,595

(22) Filed: Aug. 3, 2005

(65) Prior Publication Data
US 2005/0263493 A1 Dec. 1, 2005

Related U.S. Application Data

(62) Division of application No. 10/023,906, filed on Dec. 21, 2001.

(30) Foreign Application Priority Data
Dec. 25, 2000 (JP) .............................. 2000-391748

(51) Int. Cl.
B23H 7/04 (2006.01)
B23H 7/20 (2006.01)
(52) U.S. Cl. .................................. 219/69.12; 700/162
(58) Field of Classification Search ............. 219/69.12, 219/69.13, 69.18; 700/162
See application file for complete search history.

(56) References Cited

U.S. PATENT DOCUMENTS

| 3,705,286 A | 12/1972 | Kondo et al. |
| 3,999,028 A | 12/1976 | Saito et al. |
| 4,081,652 A | 3/1978 | Jänicke et al. |
| 4,335,436 A | 6/1982 | Inoue |
| 4,709,131 A | 11/1987 | Del Bello et al. |
| 5,233,147 A * | 8/1993 | Magara .................... 219/69.12 |
| 5,756,954 A | 5/1998 | Kamiguchi et al. |
| 5,756,956 A | 5/1998 | Sato et al. |
| 5,841,093 A | 11/1998 | Wada |
| 6,208,150 B1 | 3/2001 | Akamatsu |
| 6,278,075 B1 * | 8/2001 | Kamiguchi et al. ...... 219/69.12 |

FOREIGN PATENT DOCUMENTS

| EP | 0 934 791 A2 | 8/2001 |
| JP | 11-151620 A * | 6/1999 |
| WO | WO/ 89/07503 | 8/1989 |

OTHER PUBLICATIONS

European Search Report dated Nov. 13, 2003 for related appliation EP 01310631.
Brink, Dean, "EDM: Principles of Operation".
Jack, Hubh, "58. Electric Discharge Machining (EDM)", Aug. 31, 2001.

* cited by examiner

*Primary Examiner*—Geoffrey S. Evans
(74) *Attorney, Agent, or Firm*—Staas & Halsey LLP

(57) ABSTRACT

A discharge pulse number generated between a wire electrode and a workpiece is counted every predetermined time. A ratio Px/Ps of this counted value Px to the reference pulse number Ps will be determined to control an amount of coolant in response to this ratio Px/Ps. Also, in response to this ratio Px/Ps, an amount of movement within predetermined time is controlled. Further, through the ratio Px/Ps and the like, quiescent time to be controlled by the detection voltage generator is controlled. Thereby, surplus supply of energy is prevented, the machining speed and machining precision is improved and any disconnection of the wire electrode is avoided.

4 Claims, 18 Drawing Sheets

Fig. 3

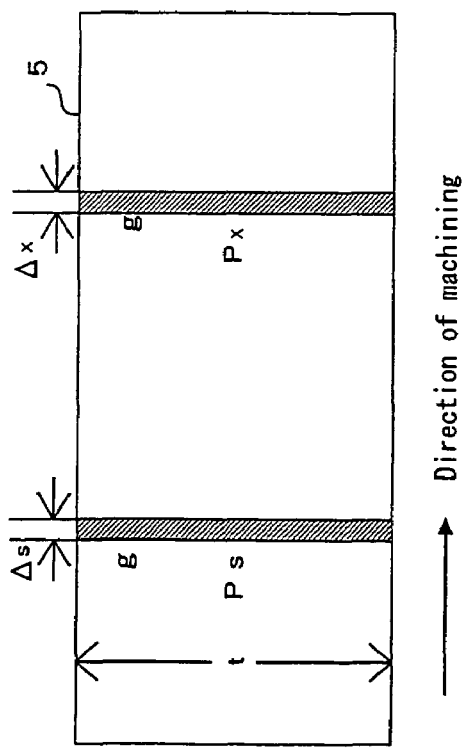

$P_s$ : Reference discharge pulse number per unit time T
$P_x$ : Discharge pulse number per unit time T
$\Delta_s$ : Distance movable with reference speed discharge pulse number $P_s$
$\Delta_x$ : Distance movable with discharge pulse number $P_x$ per unit time T
$w$ : Amount of machining per discharge pulse
$t$ : Plate thickness
$g$ : Machining groove width $P_s * w = \Delta_s * t * g$
$P_x * w = \Delta_x * t * g$ SPD : Preset feed speed which is used as a reference
Δs  : Distance movable per unit time T given by the preset feed speed SPD which is used as reference. Δs = SPD * T
Ps  : Reference discharge pulse number
Px  : Discharge pulse number per unit time T
Δx  : Distance moveble with discharge pulse number Px per unit time T Δx = Δs * Δx / Ps
   = SPD * T * (Px / Ps)

Fig. 8

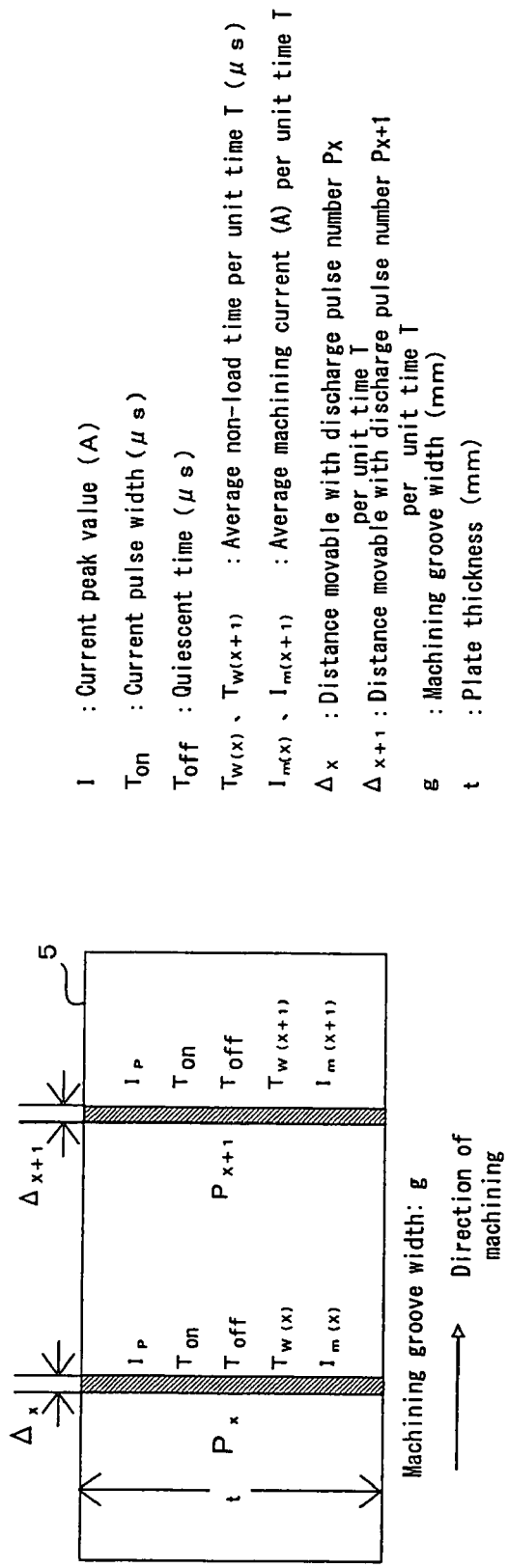
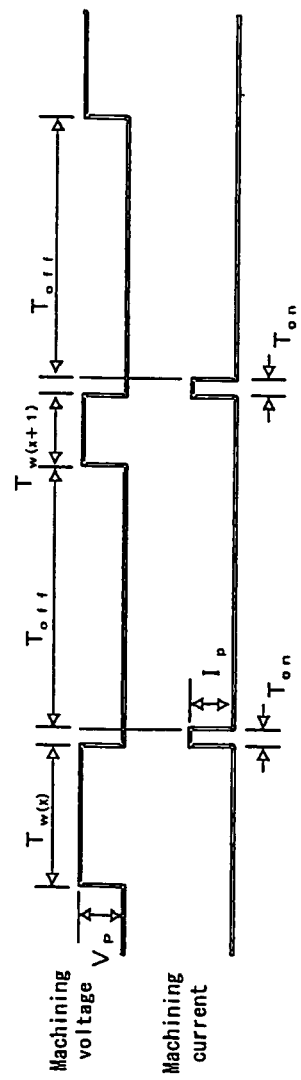

I : Current peak value (A)
$T_{on}$ : Current pulse width (μs)
$T_{off}$ : Quiescent time (μs)
$T_{w(x)}$, $T_{w(x+1)}$ : Average non-load time per unit time T per unit time T
$I_{m(x)}$, $I_{m(x+1)}$ : Average machining current (A) per unit time T
$\Delta_x$ : Distance movable with discharge pulse number $P_x$ per unit time T
$\Delta_{x+1}$ : Distance movable with discharge pulse number $P_{x+1}$ per unit time T
g : Machining groove width (mm)
t : Plate thickness (mm)

Machining start

CONTROLLER FOR WIRE ELECTRIC DISCHARGE MACHINE

CORSS-REFERENCE TO RELATED APPLICATIONS

This application is a divisional of U.S. patent application Ser. No. 10/023,906 filed Dec. 21, 2001, which claims the benefit of Japanese Patent Application No. 2000-391748 filed Dec. 25, 2000. The disclosures of the foregoing applications are all incorporated herein by reference.

BACKGROUND OF THE INVENTION

1. Field of the Invention

The present invention relates to a controller for a wire electric discharge machine, and more particularly to a control method capable of improving the machining speed and machining precision.

2. Description of the Prior Art

FIG. 18 is a view showing the outline of a conventional controller for wire electric discharge machine. A discharge pulse generator 1 applies voltage to a gap between a wire electrode 4 and a workpiece 5 in order to perform electric discharge machining, and is constituted by a DC power source, a circuit composed of a switching element such as a transistor, a charge/discharge circuit of a capacitor and the like.

A detection voltage generator 2 is a device for applying pulse voltage between the wire electrode 4 and the workpiece 5 in order to detect whether or not discharge can be performed at the gap between the wire electrode 4 and the workpiece 5, and is constituted by an active element such as a transistor, a circuit composed of a resistor, a capacitor and the like, a DC power source and the like.

A current-supply brush 3 is used to supply a wire electrode with current, and is connected to one terminal of the discharge pulse generator 1 and one terminal of the detection voltage generator 2 respectively. Also, the workpiece 5 is connected to the other terminal of the discharge pulse generator 1 and the other terminal of the detection voltage generator 2 respectively. Between the wire electrode 4 traveling and the workpiece 5, there is applied pulse voltage to be generated from the discharge pulse generator 1 and the detection voltage generator 2.

A discharge gap detection device 6 is connected to the workpiece 5 and the wire electrode 4, and judges on the basis of the transition of detection pulse voltage from the detection voltage generator 2 whether or not the discharging gap is in a dischargeable state. If dischargeable, the discharge gap detection device 6 generates a discharge pulse supply signal. Further, output from the discharge gap detection device 6 is processed by an equalizing circuit 22, and thereafter, is compared with output from a reference voltage setting device 23 to thereby obtain voltage deviation. The voltage deviation is inputted into a feed pulse arithmetic unit 24 in order to control feeding of the wire electrode. The output (pulse-like gap voltage of several μ seconds to several tens μ seconds) from the discharge gap detection device 6 is processed by the equalizing circuit 22 in order to match the output to the processing speed of the feed pulse arithmetic unit 24.

The feed pulse arithmetic unit 24 generates a pulse train, that controls the feed pulse space, on the basis of the voltage deviation to output to a feed pulse distribution device 12. The feed pulse distribution device 12 distributes this pulse train to driving pulses for X-axis and Y-axis in accordance with a machining program to output to a X-axis motor controller 10 and Y-axis motor controller 11 which drive a table with the workpiece 5 mounted thereon.

First, in order to detect whether or not discharge can be performed between the workpiece 5 and the wire electrode 4, detection pulse voltage is caused to be generated from the detection voltage generator 2 to apply to a gap between the workpiece 5 and the wire electrode 4. Then, a current is passed through between the workpiece 5 and the wire electrode 4. Then, when a voltage drop occurs between the workpiece 5 and the wire electrode 4, the discharge gap detection device 6 detects this voltage drop to judge it to be dischargeable, and transmits a discharge pulse supply signal to the discharge pulse generator 1.

As a result, the discharge pulse generator 1 generates a discharge pulse to supply the gap between the workpiece 5 and the wire electrode 4 with discharge pulse current. Thereafter, after the elapse of appropriate quiescent time during which the gap is cooled, the detection pulse will be applied to the gap again. The above described operation cycle will be repeatedly performed for electric discharge machining.

As described above, machining to remove one portion from the workpiece 5 is performed every time the discharge pulse occurs. More specifically, through the use of the detection pulse voltage, there is searched for a minute conductive passage of several tens μm or less to be formed in a gap between the wire electrode 4 and the workpiece 5, which are opposite to each other, and the discharge pulse current is flowed immediately for heating, transpiration or melting and splashing to thereby start discharging. An amount of removal per discharge pulse and machining performance differ dependent on magnitude of the discharge pulse current, characteristics such as heat of fusion, coefficient of thermal conductivity and viscosity during melting of materials of the wire electrode 4 and the workpiece 5, characteristics relating to cooling due to coolant (machining liquid) and sludge discharge, and the like.

Also, the next discharge subsequent to the generation of a certain discharge tends to concentratedly occur in the vicinity of a place where there exist a multiplicity of micro conductive passages through sludge which is mainly generated immediately after the previous discharge is terminated. For this reason, precise servo feed control and quiescent time control are requested so as to prevent discharges which occur one after another from being concentrated on one place.

FIG. 19 is a view showing a monitored waveform for machining voltage, machining current and machining speed when a square pillar of die steel shown in FIG. 13 has been cut out by a conventional method. At a corner where the direction of machining changes by right angle, idle feeding is performed by an amount corresponding to the gap in an instant. For this reason, the machining current decreases and the machining voltage becomes higher. Accordingly, the feed speed command becomes larger. After the direction is changed, the wire electrode and the workpiece approach to each other more than necessary to make the gap narrower, and it becomes difficult to discharge sludge smoothly. As a result, the sludge concentration becomes higher to cause discharge concentration, resulting in short-circuit or disconnection of the wire electrode.

For this reason, in the conventional control, it is necessary to provide servo feed (relative feed of the wire electrode to the workpiece) or discharge quiescent time within a fixed time or distance immediately after the corner, and further to separately add a process for confirming liquid pressure of the coolant in advance for evaluation. Moreover, precision correction to cope with change in plate thickness and shape of the corner of the workpiece is very complicated and difficult.

In the conventional feed control, as described above, since the detection is performed in terms of gap voltage, it lacks accuracy of feed, and disconnection easily occurs particularly in a state in which the wire electrode has been stretched tight, and therefore, it is not possible to comply with any desire to improve the machining speed. Also, particularly at a corner portion or the like in the shape of machining, disconnection easily occurs, and in order to prevent the disconnection, it is necessary to add a corner control process and the like such as decreasing the feed speed or the machining current.

OBJECTS AND SUMMARY OF THE INVENTION

It is an object of the present invention to provide a controller for a wire electric discharge machine capable of wire electric discharge machining at predetermined feed speed and machining current without any disconnection of a wire electrode particularly on machining a corner portion and the like.

With the controller for a wire electric discharge machine according to the present invention, electric discharge machining is performed by applying electric discharge pulse current between a wire electrode and a workpiece while a wire electric discharge machine is causing the wire electrode and the workpiece to relatively move to each other.

A first aspect of the controller has: discharge pulse number counting means for counting a discharge pulse number applied every predetermined time, or discharge pulse current integrated value computing means for computing to integrate discharge pulse current applied; moving means for relatively moving the wire electrode and the workpiece to each other along a machining path on the basis of a moving command; and memory means for storing a discharge pulse number which is used as a reference or a reference discharge pulse current integrated value; and determines a ratio of a numerical value obtained by the discharge pulse number counting means or the discharge pulse current integrated value computing means to the reference discharge pulse number or the integrated value, and outputs distance obtained by multiplying relative moving distance between the wire electrode and the workpiece to be determined by the preset feed speed and the predetermined time by the above described ratio, to the moving means as a moving command every the predetermined time.

Also, there is provided means for controlling a discharge quiescent time such that a discharge pulse number for every predetermined time coincides with a reference discharge pulse number in response to the discharge pulse number for every predetermined time and the reference discharge pulse number, or there is provided means for controlling a discharge quiescent time such that a discharge pulse number for every predetermined time coincides with a reference discharge pulse number in response to the discharge pulse current integrated value for every predetermined time and the reference discharge pulse current integrated value, to thereby prevent surplus energy from being supplied.

Furthermore, there is provided a liquid amount controller which increases or decreases an amount of coolant on the basis of a ratio of a discharge pulse number for every predetermined time or the discharge pulse current integrated value to a reference discharge pulse number or a reference integrated value to control the amount of the coolant.

Also, a second aspect of the controller is to control a relative moving distance of a wire electrode with respect to a workpiece by means of moving distance control means on the basis of an amount of machining of the workpiece through electric discharge pulse, or to control a discharge quiescent time, or to control an amount of coolant.

The control based on an amount of machining of a workpiece through discharge pulses detects an amount of discharge machining on the basis of a counted value obtained by counting discharge pulse number applied every predetermined time and a predetermined value determined in advance, or detects an amount of discharge machining on the basis of a value obtained by computing to integrate discharge pulse current applied every predetermined time and a predetermined value determined in advance.

BRIEF DESCRIPTION OF THE DRAWINGS

The above and further objects and features of the present invention will become apparent from the following description of embodiments with reference to the accompanying drawings, in which:

FIG. 3 is a view for explaining generation of an amount of movement caused by a change in the amount of machining;

FIGS. 5A to 5C are views showing that relationship between the amount of movement and the discharge pulse number varies depending upon material of the workpiece, plate thickness thereof, machining groove width and the like;

FIG. 8 is a view for explaining relationship between quiescent time and an amount of machining and the like;

DETAILED DESCRIPTION OF THE PREFERRED EMBODIMENTS

Figure 1:
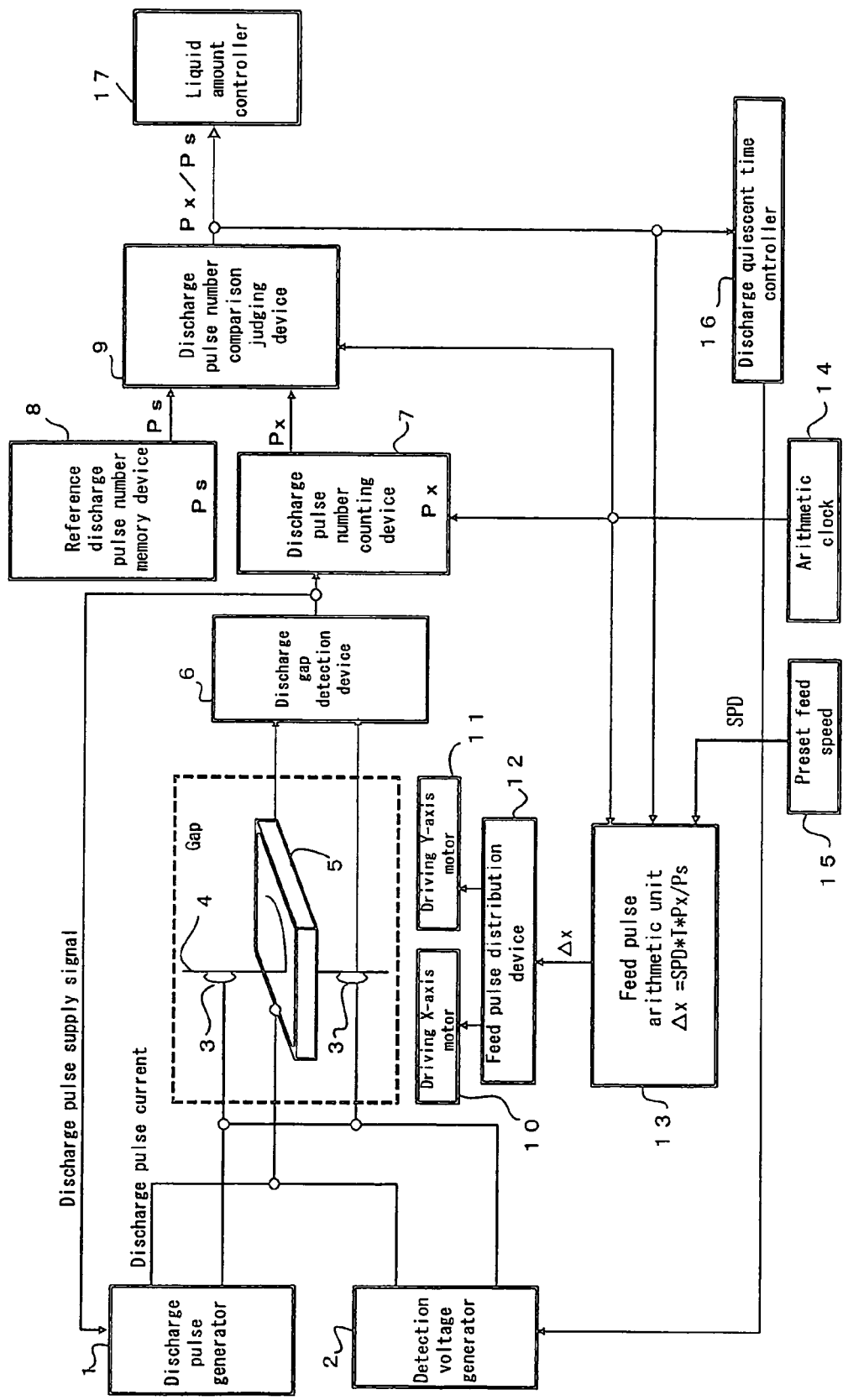
FIG. 1 is an essential block diagram showing a controller for a wire electric discharge machine according to a first embodiment of the present invention.

First, the description will be made of the principle of operation of the present invention.

FIG. 3 is an explanatory view for illustrating relationship between machining energy supplied and amount of machining in the wire electric discharge machining, and when a portion indicated by Δs in the figure and a portion indicated by Δx have been machined, the following relational expressions are established:

$$Ps*w = \Delta s*t*g \quad Px*w = \Delta x*t*g \quad (1)$$

That is, the following is given.

$$Ps/\Delta s = Px/\Delta x = t*g/w \quad (2)$$

where t is plate thickness of the workpiece 5; Ps and Px are a number of discharge pulses to be generated per unit time T in the portions indicated by Δs and Δx in the figure; w is an amount of machining per discharge pulse; Δs is distance moveable with discharge pulse number Ps; Δx is distance moveable with discharge pulse number Px; and g is machining groove width. Also, if the amount of machining w per discharge pulse is constant, the discharge pulse numbers Ps and Px show values proportional to the amount of machining which is generated within unit time T respectively.

If machining groove width g is assumed to be constant on condition that plate thickness t remains unchanged, the following expression is established:

$$Ps/Px = \Delta s/\Delta x \quad (3)$$

The above expression means that if a wire electrode can be fed such that a change (Ps→Px) in discharge pulse number per unit time T and a change (Δs→Δx) in amount of feed movement caused thereby satisfy the above-described expression (3), machining groove width g becomes constant.

A reference amount of movement Δs per unit time T can be given from preset feed speed SPD which is used as a reference and is set and inputted, by means of the following expression:

$$\Delta s = SPD*T \quad (4)$$

From the expressions (3) and (4), the amount of movement Δx is given by the following expression:

$$\Delta x = SPD*T*(Px/Ps) \quad (5)$$

In this respect, the above described expression (5) shows that when a feed speed SPD is set, the amount of movement Δx is determined by Px/Ps.

Figure 4:
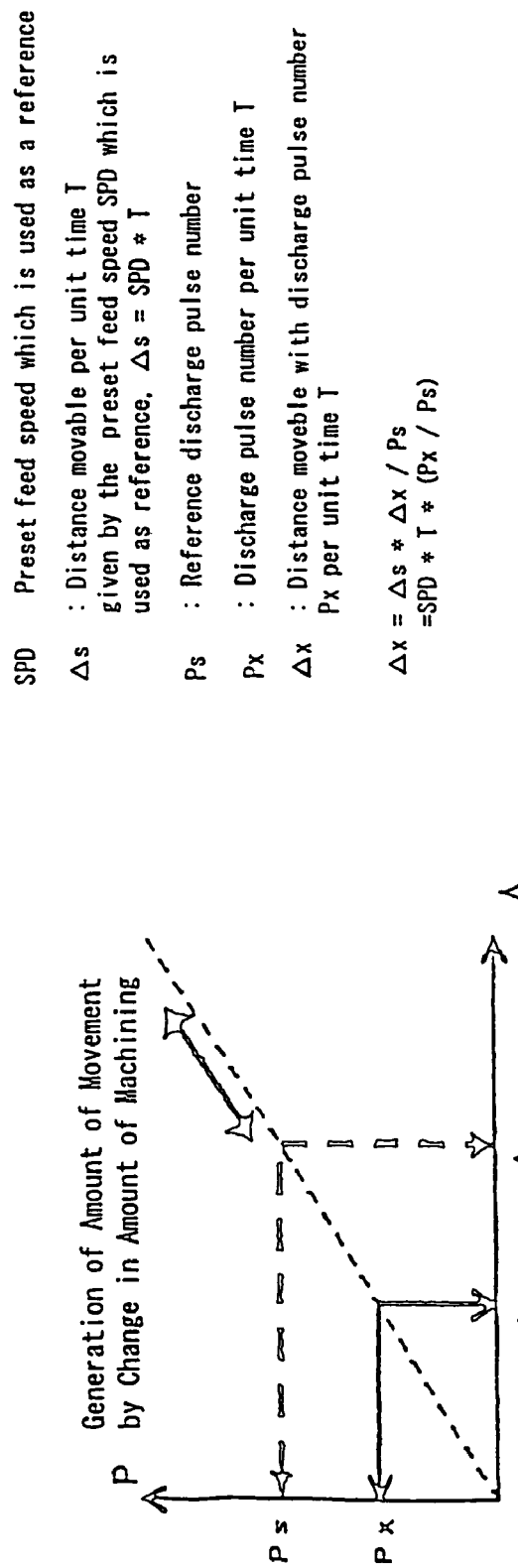
FIG. 4 is an explanatory view for illustrating an amount of movement corresponding to the change in the amount of machining.

FIG. 4 represents relationship between expressions (3) and (5) with the amount of movement Δ taken on the abscissa and the discharge pulse number P taken on the ordinate. If discharge pulse number Ps which is used as a reference and a preset feed speed SPD which is used as a reference are set, an amount of movement Δx can be determined, using the expression (5), by counting discharge pulse number Px per unit time T which changes every moment during machining.

This amount of movement Δx can, from the expression (1), be represented by the following:

$$\Delta x = (Px*w)/(t*g)$$

Px*w in this expression is an amount of machining when discharge pulse Px occurs. Since the amount of movement Δx is obtained by dividing the amount of machining by the product of plate thickness of a workpiece and machining groove width, moving a wire electrode by the amount of movement Δx will correspond to moving the wire electrode by an amount machined by discharge pulse of Px. That is, the expression (5) represents that the amount of movement Δx of the wire electrode corresponding to the amount of machining through the discharge pulse is generated from the discharge pulse number Ps, which is used as a reference, and a counted value Px of the discharge pulse number per unit time T.

Generally, the relationship between an amount of movement Δ and discharge pulse number P varies dependent upon material of a workpiece, plate thickness t thereof, machining groove width g and the like.

Figure 5A:
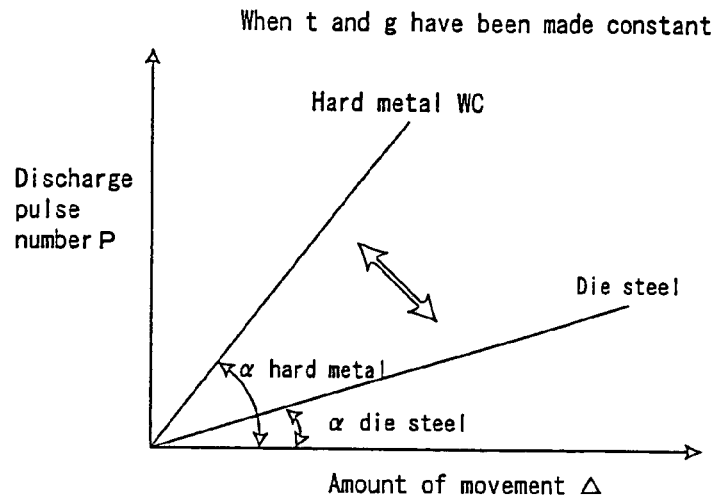

For example, when a plate thickness t of the workpiece and machining groove width g are made constant, the relationship between an amount of movement Δ and discharge pulse number P becomes one as is shown in FIG. 5A. The inclination α of the straight line of FIG. 5A corresponds to t*g/w in the expression (2), but since t and g is made constant, the inclination α represents 1/w in the expression (2) In FIG. 5A, hard metal WC has an inclination larger than die steel. This means that the hard metal is smaller in amount of machining w per discharge pulse than the die steel. This coincides with the fact that it is more difficult to process a hard metal with electric discharge machining than to process a die steel with electric discharge machining.

Figure 5B:
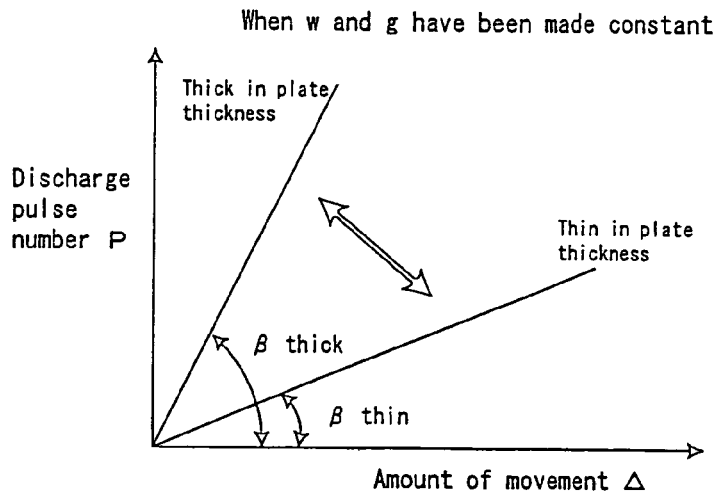

Also, when plate thickness t of the workpiece made of the same material has been changed with the machining groove width g kept constant, the relationship between the amount of movement Δ and the discharge pulse number P becomes that as is shown in FIG. 5B. In this case, since g and w in the expression (2) are constant, the inclination β of the straight line in FIG. 5B represents the plate thickness t of the workpiece.

Figure 5C:
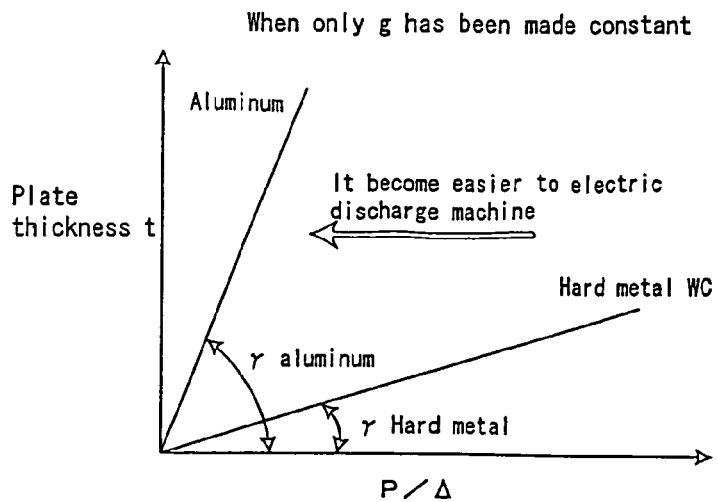

Further, FIG. 5C shows relationship between a ratio (P/Δ) of the discharge pulse number P to the amount of movement Δ and the plate thickness t of the workpiece with the machining groove width g made constant. Since the following expression is established from the expression (2), $$t = (w/g)*(P/\Delta)$$

the inclination γ of the straight line of FIG. 5C is given by (w/g). In this case, since the machining groove width g is made constant, the inclination γ represents an amount of machining w per discharge pulse. That the inclination γ of the aluminum is large while the inclination γ of the hard metal WC is smaller in FIG. 5C means that the amount of machining w per discharge pulse is large in aluminum and is smaller in the hard metal WC. This generally coincides with the fact that aluminum is easy to process by electric discharge machining while the hard metal WC is difficult to process by electric discharge machining.

Since the relationship between an amount of movement Δ and discharge pulse number P varies dependent upon material of the workpiece, plate thickness t thereof, machining groove width g and the like as described above, on controlling the amount of movement Δx of a wire electrode on the basis of the expression (5), the relationship between the discharge pulse number Ps which is used as a reference and the preset feed speed SPD (=Δ/T) which is used as a reference is determined in advance. That is, concerning workpieces made of various materials, by varying plate thickness of the workpieces and the diameter of a wire electrode (machining groove width) in various ways, relationship between discharge pulse number P per unit time T and moving speed Δ per unit time T is determined, and ratio κ of discharge pulse number P to amount of movement Δ is determined by $$\kappa = P/\Delta \qquad (6)$$

in advance as shown in Table 1 to Table 3. In this respect, if κ determined in advance is multiplied by the preset feed speed SPD, the discharge pulse number Ps which is used as a reference can be determined.

TABLE 1

Diameter of Wire Electrode: φ1

| Material | Plate thickness 1 | Plate thickness 2 | ... | Plate Thickness j | ... | Plate thickness N |
|---|---|---|---|---|---|---|
| Material 1 | $\kappa_{111}$ | $\kappa_{112}$ | ... | $\kappa_{11j}$ | ... | $\kappa_{11N}$ |
| Material 2 | $\kappa_{121}$ | $\kappa_{122}$ | ... | $\kappa_{12j}$ | ... | $\kappa_{12N}$ |
| ... | | | | | | |
| Material i | $\kappa_{1i1}$ | $\kappa_{1i2}$ | ... | $\kappa_{1ij}$ | ... | $\kappa_{1iN}$ |
| ... | | | | | | |
| Material M | $\kappa_{1M1}$ | $\kappa_{1M2}$ | ... | $\kappa_{1Mj}$ | ... | $\kappa_{1MN}$ |

TABLE 2

Diameter of Wire Electrode: φ2

| Material | Plate thickness 1 | Plate thickness 2 | ... | Plate Thickness j | ... | Plate thickness N |
|---|---|---|---|---|---|---|
| Material 1 | $\kappa_{211}$ | $\kappa_{212}$ | ... | $\kappa_{21j}$ | ... | $\kappa_{21N}$ |
| Material 2 | $\kappa_{221}$ | $\kappa_{222}$ | ... | $\kappa_{221}$ | ... | $\kappa_{22N}$ |
| ... | | | | | | |
| Material i | $\kappa_{2i1}$ | $\kappa_{2i2}$ | ... | $\kappa_{2ij}$ | ... | $\kappa_{2iN}$ |
| ... | | | | | | |
| Material M | $\kappa_{2M1}$ | $\kappa_{2M2}$ | ... | $\kappa_{2Mj}$ | ... | $\kappa_{2MN}$ |

TABLE 3

Diameter of Wire Electrode: φ3

| Material | Plate thickness 1 | Plate thickness 2 | ... | Plate Thickness j | ... | Plate thickness N |
|---|---|---|---|---|---|---|
| Material 1 | $\kappa_{311}$ | $\kappa_{312}$ | ... | $\kappa_{31j}$ | ... | $\kappa_{31N}$ |
| Material 2 | $\kappa_{321}$ | $\kappa_{322}$ | ... | $\kappa_{32j}$ | ... | $\kappa_{32N}$ |
| ... | | | | | | |
| Material i | $\kappa_{3ii1}$ | $\kappa_{3i2}$ | ... | $\kappa_{3ij}$ | ... | $\kappa_{3iN}$ |
| ... | | | | | | |
| Material M | $\kappa_{3M1}$ | $\kappa_{3M2}$ | ... | $\kappa_{3Mj}$ | ... | $\kappa_{3MN}$ |

On starting electric discharge machining, κ is read from the above described Tables on the basis of the material of the workpiece to determine the discharge pulse number Ps(=κ*SPD) which is used as a reference, by multiplying the read κ by the set feed speed SPD. Thus, during electric discharge machining, an amount of movement (relative movement) of the wire electrode is controlled on the basis of the expression (5) while detecting discharge pulse number P per unit time T.

In this respect, a plate thickness which is set as a machining condition does not always exist on the above described Tables, but in such a case, κ corresponding to the preset plate thickness can be determined from a known κ existing on the Tables. For example, when a preset plate thickness is between plate thickness 1 and plate thickness 2, κ corresponding to the preset plate thickness can be determined from κ1 corresponding to the plate thickness 1 and κ2 corresponding to the plate thickness 2 by means of a method such as proportional distribution. Also, κ corresponding to the preset plate thickness can be also determined by obtaining an approximate curve of κ corresponding to the plate thickness from the value of κ corresponding to the plate thickness 1 to plate thickness N. Alternatively, it is also possible to set κ manually while referring to the Tables.

Also, even when the material of a workpiece to be processed actually by electric discharge machining does not exist on the above described Tables, κ can be set with the following concept. That κ is large means that a larger discharge pulse number is required to machine the same distance (amount of movement Δ), as shown in expression (6), or that the amount of machining w per discharge pulse is small. On the contrary, that κ is small means that less discharge pulse number is required to machine the same distance or that an amount of machining w per discharge pulse is large. Therefore, in a material which is easy to process by electric discharge machining, κ becomes small, and in a material which is difficult to process by electric discharge machining, κ becomes large. Accordingly, even when the material of a workpiece to be actually processed by electric discharge machining does not exist on the above described Tables, in the case where the degree of difficulty in machining a material is known from the past experiences and the like, material having nearly the same degree of difficulty in machining as the degree of difficulty in machining of the material can be searched from the above described Tables to be set as material of the workpiece. Alternatively, if the degree of difficulty in machining of a workpiece to be actually processed by electric discharge machining is known to be an intermediate between the degree of difficulty in machining of material A and the degree of difficulty in machining of material B, an intermediate value between κ of the material A and κ of the material B can be also manually set.

Next, control of quiescent time is described with reference to FIG. 8.

FIG. 8 is a view showing a machined state of a workpiece 5 and a state of machining voltage and current between the workpiece 5 and the wire electrode 4.

In FIG. 8, Px and Px+1 are discharge pulse numbers per unit time T at positions indicated by Δx and Δx+1 in the figure respectively; Vx and Vx+1 are average machining voltage at positions indicated by Δx and Δx+1 respectively; Vp is non-load voltage; Ton is current pulse width; Toff is quiescent time; and Tw(x) and Tw(x+1) are average non-load time per unit time T respectively. Also, Ps, Vs, Tw(s) are discharge pulse number per unit time T which is used as a reference, reference average machining voltage, and reference average non-load time, respectively.

$$Px=T/(Tw(x)+Ton+Toff)$$

$$Px+1=T/(Tw(x+1)+Ton+Toff)$$

$$Ps=T/(Tw(s)+Ton+Toff)$$

$$Vx=Vp*Tw(x)/(Tw(x)+Ton+Toff)$$

$$Vx+1=Vp*Tw(x+1)/(Tw(x+1)+Ton+Toff)$$

$$Vs=Vp*Tw(s)/(Tw(s)+Ton+Toff)$$

Further, assuming that Ton<<Tw+Toff, respective Tw+Ton+Toff are replaced with actual quiescent time τ to thereby pigeonhole the above described expressions.

$$Tw(x)+Toff=\tau x \quad (7)$$

$$Tw(x+1)+Toff=\tau x+1 \quad (8)$$

$$Tw(s)+Toff=\tau s \quad (9)$$

$$Px=T/\tau x \quad (10)$$

$$Px+1=T/\tau x+1 \quad (11)$$

$$Ps=T/\tau s \quad (12)$$

$$Vx=Vp*(\tau x-Toff)/\tau x=Vp*(1-Toff/\tau x) \quad (13)$$

$$Vx+1=Vp*(\tau x+1-Toff)/\tau x+1=Vp*(1-Toff/\tau x+1) \quad (14)$$

$$Vs=Vp*(\tau s-Toff)/\tau s=Vp*(1-Toff/\tau s) \quad (15)$$

Also, respective average machining current Im(s), Im(x), Im(x+1) per unit time T, and average machining current density Id(s), Id(s) and Id(s+1) can be obtained by the following expression, where t is plate thickness, and d is machining groove width.

$$Im(s)=Ip*Ton*Ps \quad (16)$$

$$Id(s)=Im(s)/(t*g) \quad (17)$$

$$Im(x)=Ip*Ton*Px \quad (18)$$

$$Id(x)=Im(x)/(t*g) \quad (19)$$

$$Im(x+1)=Ip*Ton*Px+1 \quad (20)$$

$$Id(x+1)=Im(x+1)/(t*g) \quad (21)$$

From the above described expression (2) and the above expressions (14) to (19), the following expressions are established:

$$\Delta s/\Delta x=Ps/Px=Id(s)/Id(x) \quad (22)$$

$$\Delta s/\Delta x+1=Ps/Px+1=Id(s)/Id(x+1) \quad (23)$$

That is, these expressions (22) and (23) mean that when machining feed is performed on the basis of the expression (5), the average machining current density per unit time T also increases or decreases.

This will be described below with reference to FIGS. 6A and 6B.

Figure 6A:
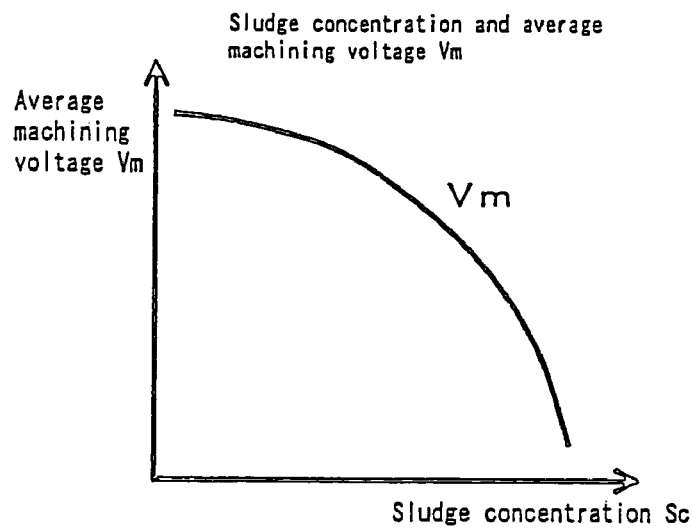
FIGS. 6A and 6B are views for explaining relationship between sludge concentration and average machining voltage, discharge pulse number and actual quiescent time.

In FIG. 6A, the abscissa represents sludge concentration SC within a discharging gap, the ordinate represents average machining voltage Vm, and the curved line shows relationship between the sludge concentration SC and the average machining voltage Vm during electric discharge machining.

When the sludge concentration SC starts to become higher, a multiplicity of minute conductive paths are detected through sludge as an inducement to an electric discharge, and the average machining voltage Vm is considered to shift along such a curved line as is shown in FIG. 6A.

Figure 6B:
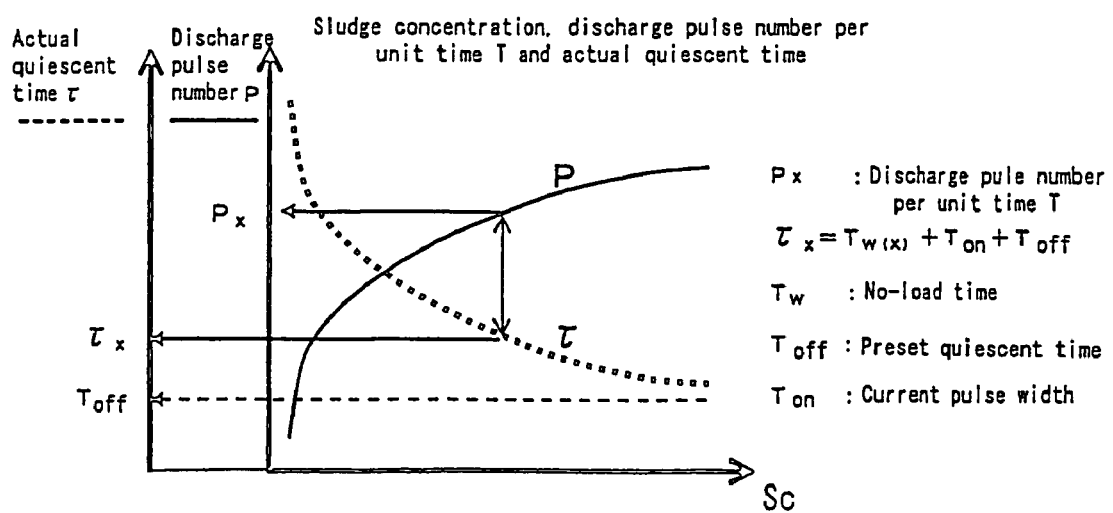

In FIG. 6B, the abscissa represents sludge concentration SC within a discharging gap, while the ordinate represents discharge pulse number P occurring per unit time and actual quiescent time τ. The curved line in FIG. 6B shows relationship between sludge concentration SC which changes every moment during electric discharge machining and discharge pulse number P per unit time, and relationship between sludge concentration SC and actual quiescent time τ.

The curved line represents that, when the sludge concentration SC starts to become higher, a multiplicity of minute conductive paths are detected through sludge as an inducement to electric discharge, discharge pulses applied increase and actual quiescent time τ decreases. Also, with decrease in the actual quiescent time τ along this curved line, non-load time Tw also becomes shorter, so that concentrated electric discharge is started due to the above described peculiarity of generation of electric discharge, thereby causing wire disconnection, worse surface roughness, and non-uniform groove width.

In a conventional technique, quiescent time Toff is set to a slightly higher value in advance to prevent such a worst condition from occurring. Further, when concentrated electric discharge occurs due to small area of machining at the time of cutting into an end surface of a workpiece, and when coolant for an electric discharge portion escapes to cause insufficient cooling, quiescent time Toff is set to a slightly higher value in advance.

In the present invention, such a problem is solved by automatically changing the quiescent time (Toff) so as to prevent discharge pulse number from exceeding a limit to increase. This will be described with reference to FIG. 7A.

Figure 7A:
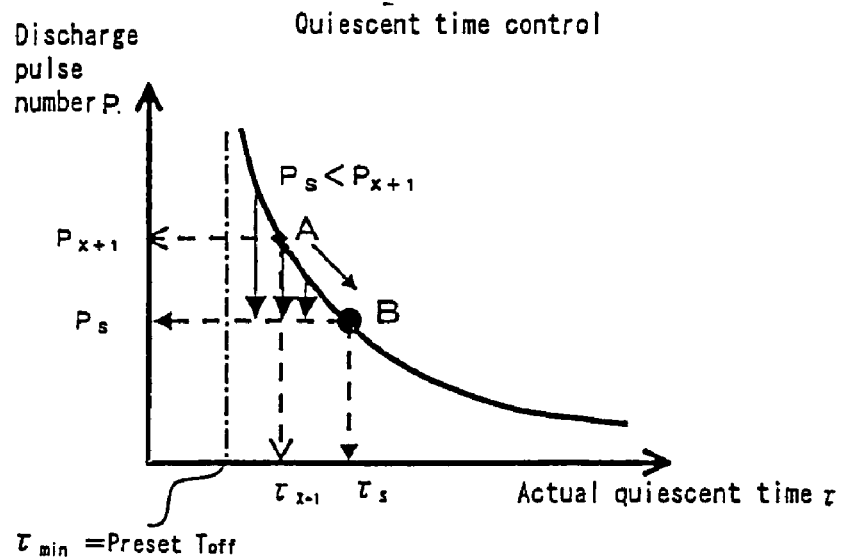
FIGS. 7A and 7B are views for explaining relationship between actual quiescent time and discharge pulse number and average machining voltage.

The abscissa of FIG. 7A represents actual quiescent time τ, and the ordinate represents discharge pulse number P per unit time T, and expressions (11) and (12) are shown in this figure. When machining is performed on conditions that the expression (5) is satisfied (that is, on condition that plate thickness t and machining groove width g are made constant), discharge pulse number P per unit time T and actual quiescent time τ change along the solid line of FIG. 7A in accordance with amount of machining and sludge concentration SC.

Here, explained below is a quiescent time control wherein a reference discharge pulse number Ps at which optimum discharge pulse density can be obtained and the actual quiescent time τs at that time at a point B on the line are set and a discharge pulse number Px+1 which exceeds the reference discharge pulse number Ps occurs.

Figure 9:
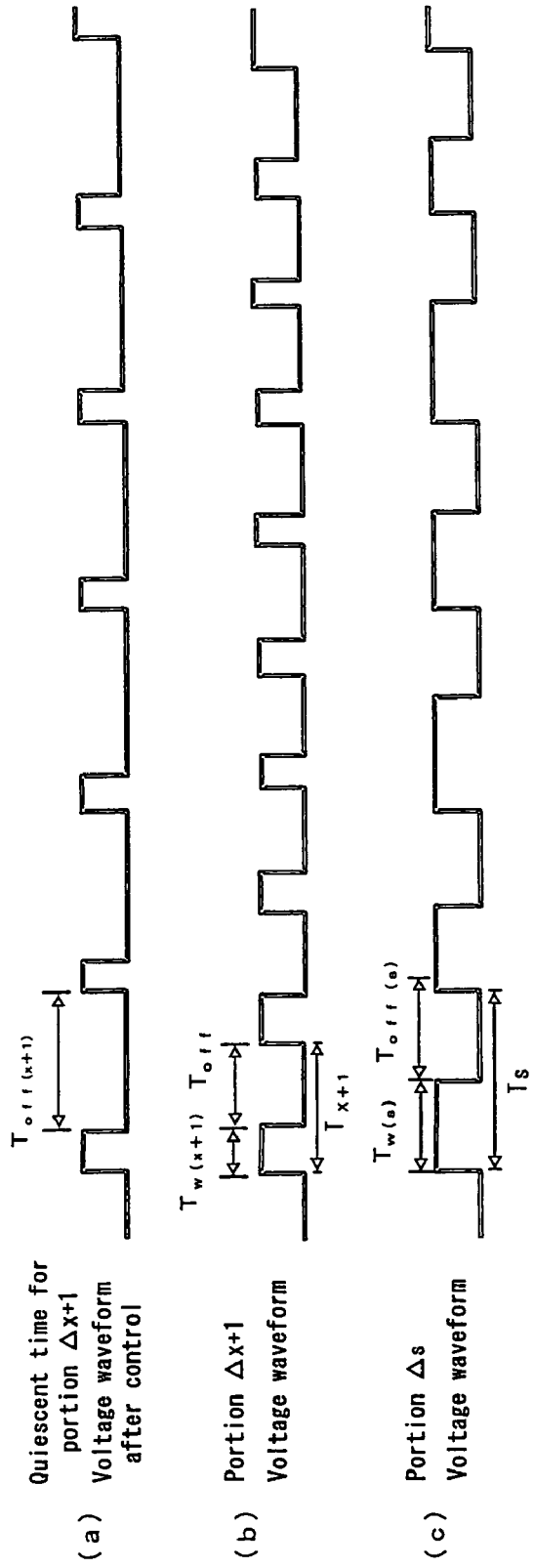
FIG. 9 is a view for explaining quiescent time control at point A in FIG. 7A.

In order to cause the discharge pulse number Px+1 at point A, which satisfies relationship of Px+1>Ps in FIG. 7A, to approach to the reference discharge pulse number Ps, the preset reference quiescent time Toff(s) can be extended as shown in FIG. 9 by difference between the actual quiescent time τx+1 and τs, that is, by the amount by which the non-load quiescent time Tw is shortened.

FIG. 9 is a view showing voltage waveform between a wire electrode and a workpiece, and FIG. 9(c) is a voltage waveform at point B in FIG. 7A, which is a reference voltage waveform. Also, FIG. 9(b) is a voltage waveform at point A in FIG. 7A, which is obtained before the present invention is applied. FIG. 9(a) is a voltage waveform at point A in FIG. 7A, which is obtained when the present invention is applied. As seen from FIG. 9, the number of electric discharges is large in FIG. 9(b) but small in FIG. 9(a).

If quiescent time to be controlled is Toff(x+1), the following expressions are established:

$$\tau s - \tau x+1 = Toff(x+1) - Toff(s) \quad (24)$$

$$\therefore Toff(x+1) = \tau s - \tau x + 1 + Toff(s) \quad (25)$$

From expressions (11) and (12), the following expression is established:

$$Toff(x+1) = (1/Ps - 1/Px+1)*T + Toff(s) \quad (26)$$

That is, to control the quiescent time so as to coincide with point B at which optimum discharge pulse density can be obtained is realized by determining difference between the reciprocal of the discharge pulse number Ps which is used as a reference of point B and the reciprocal of discharge pulse number Px+1 at point A every unit time T to extend from the reference quiescent time Toff(s) by the difference.

Next, with reference to FIG. 7B, the description will be made of quiescent time control at point C which is lower than the reference discharge pulse number Ps, that is, when the discharge pulse number Px occurs.

Figure 7B:
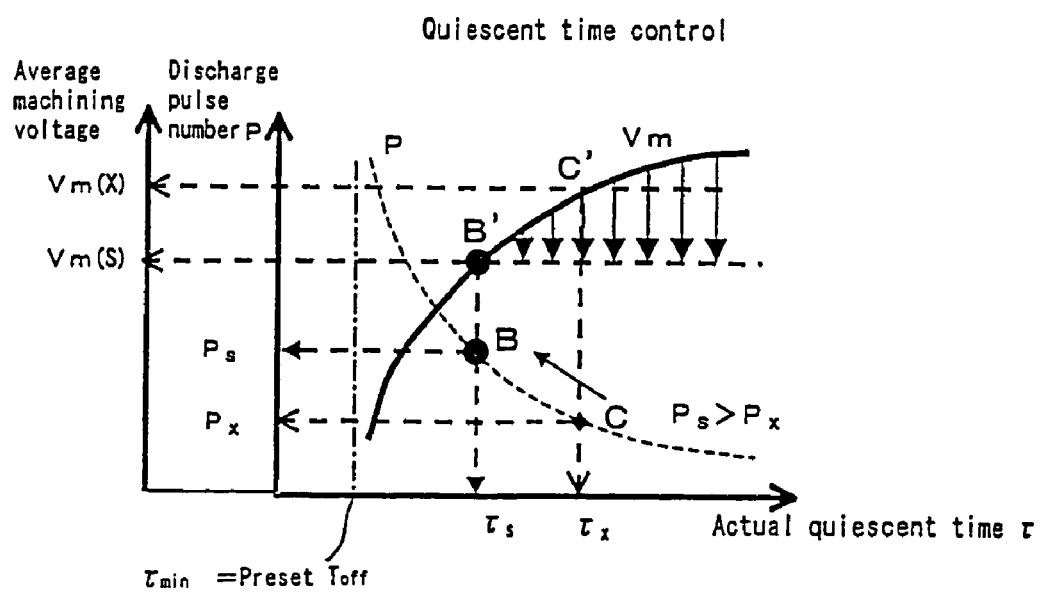

In FIG. 7B, the abscissa represents actual quiescent time T, and the ordinate represents the discharge pulse number P and the average machining voltage Vm. The curved line of FIG. 7B shows a transition (expression (10) and expression (12)) of discharge pulse number P when τ changes from τs to τx, and a transition (expression (13) and expression (15)) of an average machining voltage Vm.

Since amount of machining at point C is usually small, a discharge pulse having long no-load time Tw(x) with long actual quiescent time occurs as shown in FIG. 10(b). From the above described peculiarity of generation of electric discharge, however, consecutive short discharge pulses in non-load time Tw(x) through sludge might occur to cause wire disconnection. More specifically, voltage lowers in an instant passing over point C' and point B' of the average machining voltage, and as a result, a phenomenon in which the short discharge pulse in non-load time Tw(x) is supplied to the gap is frequently observed. Therefore, in order to prevent such short discharge pulse from being supplied to the gap, quiescent time may be extended as shown in FIG. 10(a) in advance such that actual quiescent time τx does not become lower than τs even if average machining voltage becomes lower than point B' during machining.

In other words, if quiescent time required in controlling to make average machining voltage Vm at point B' and point C' equal to each other is assumed to be Toff(x), the following expression will be established from expressions (13) and (15).

$$Vx = Vp*(1 - Toff(x))/Tx = Vs = Vp*(1 - Toff(s))/\tau s \quad (27)$$

$$\text{Accordingly, } Toff(x) = Toff(s)*Tx/Ts \quad (28)$$

By pigeonholing from the expressions (10) and (12), the following expression is established:

$$Toff(x) = Toff(s)*(Ps/Px) \quad (29)$$

In other words, quiescent time Toff(x) is obtained by multiplying reference quiescent time Toff(s) by reciprocal of the ratio of discharge pulse number Px to discharge pulse number Ps which is used as a reference, whereby the intended object is achieved. As described above, on the basis of the evaluation function based on the expressions (26) and (29), discharge quiescent time is controlled so as to restrain surplus energy from being supplied in advance.

In this respect, on controlling discharge quiescent time on the basis of the expressions (26) and (29), in the same manner as described above, κ which is determined in advance concerning various materials, plate thickness and diameter of the wire electrode can be used. In this case, discharge pulse number Ps (=κ*SPD) which is used as a reference is determined by multiplying the determined κ by preset feed speed SPD, and using this discharge pulse number Ps, the expressions (26) and (29) will be operated.

Figure 10:
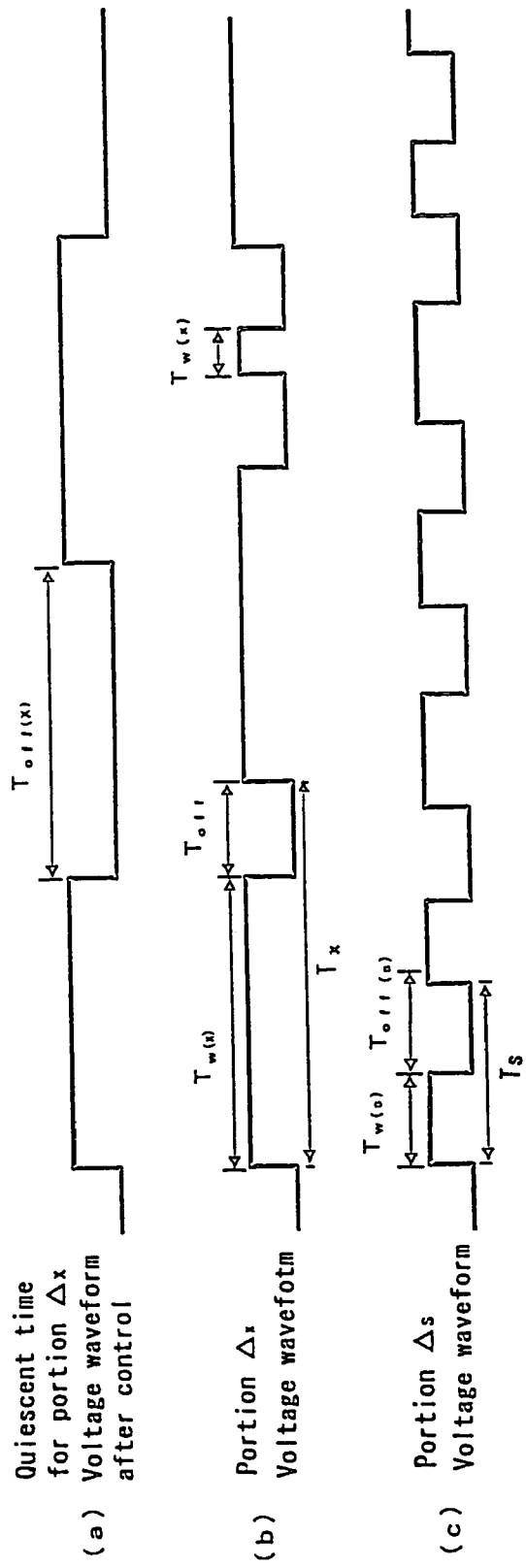
FIG. 10 is a view for explaining quiescent time control at point C in FIG. 7B.

FIG. 10 is a view showing a voltage waveform between a wire electrode and a workpiece, and FIG. 10(c) shows a voltage waveform at point B in FIG. 7B, which is a reference voltage waveform. Also, FIG. 10(b) shows a voltage waveform at point C in FIG. 7B, which is a waveform obtained before the present invention is applied. FIG. 10(a) shows a voltage waveform at point C in FIG. 7B, which is a waveform obtained when the present invention is applied.

At the commencement of machining and in machining of a corner portion in which idle feeding occurs, electric discharge is difficult to occur (non-load quiescent time Tw is large) even if voltage is applied between a wire electrode and a workpiece, and discharge pulse number Px is smaller than the reference pulse number Ps (that is, Ps/Px>1). For this reason, quiescent time Toff(x) to be determined by expression (29) becomes larger than the reference quiescent time Toff(s). However, since, during that time, the wire electrode relatively moves to the workpiece to reduce the gap, the non-load quiescent time Tw becomes smaller, electric discharge occurs earlier, and discharge pulse number Ps within the unit time T increases. If discharge pulse number Ps increases, quiescent time Toff (x) to be determined by expression (29) will become shorter to approach to the reference quiescent time Toff(s).

When discharge pulse number Px+1 exceeds the reference pulse number Ps, a quiescent time Toff(x+1) is determined by operating the expression (26), and this quiescent time Toff(x+1) becomes longer than the reference quiescent time Toff (x+1) by T/Ps−T/Px+1 (>0). The longer the quiescent time Toff(x+1) is, the smaller the discharge pulse number Px+1 becomes to be (assuming that non-load quiescent time Tw is constant, the longer the quiescent time Toff(x+1) is, the smaller discharge pulse number Px+1 becomes to be).

As described above, quiescent time Toff(x) is controlled such that discharge pulse number Px coincides with the reference pulse number Ps.

On the other hand, if discharge pulse number fluctuates, the amount of machining to be machined by the electric discharge and the temperature rise will fluctuate. Thus, the present invention controls temperature rise in a gap associated with fluctuations in discharge pulse number per unit time T, and controls an amount (flow rate) of coolant (machining fluid) for discharging sludge which is generated by machining. In other words, when discharge pulse number per unit time increases and an amount of machining is large, an amount of coolant will be increased to restrain temperature of the gap from rising, so that sludge will be smoothly excluded. Also, when an amount of machining is small and discharge pulse number per unit time T is small, an amount of coolant is reduced to prevent supercooling, so that vibration of a wire electrode is restrained to stabilize electric discharge.

Figure 11:
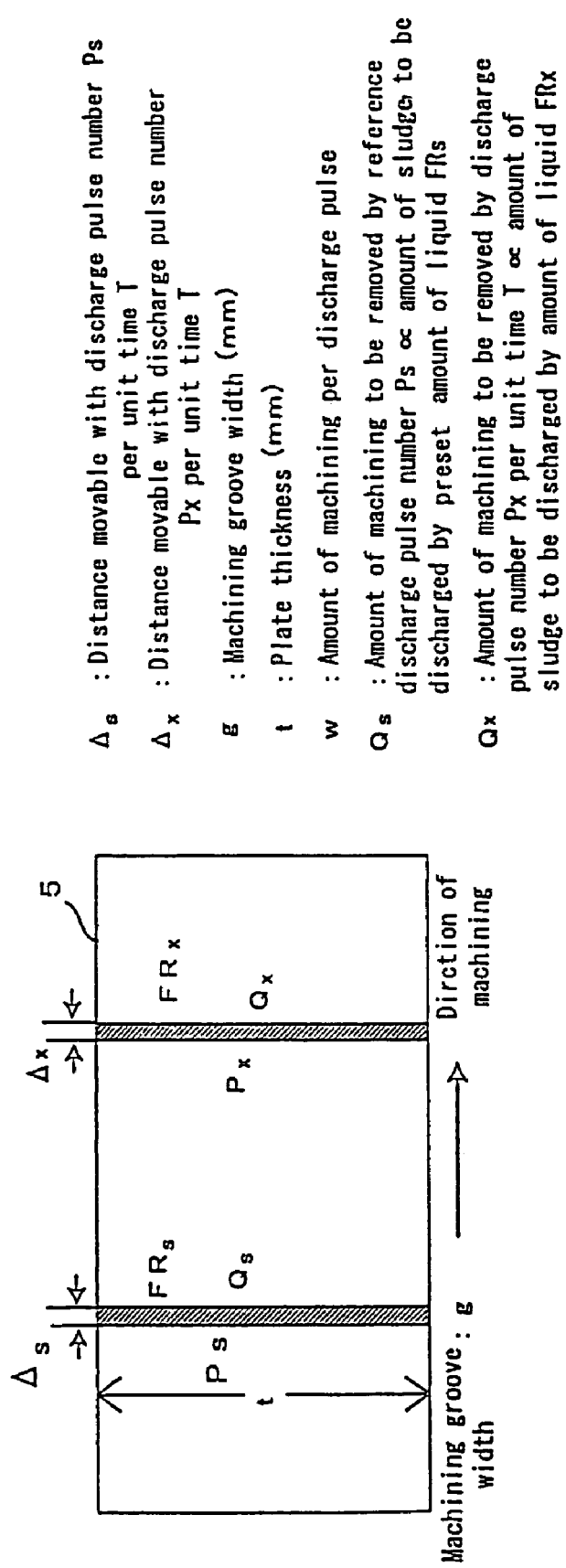
FIG. 11 is a view for explaining control of a liquid amount due to a change in an amount of machining.
Figure 12:
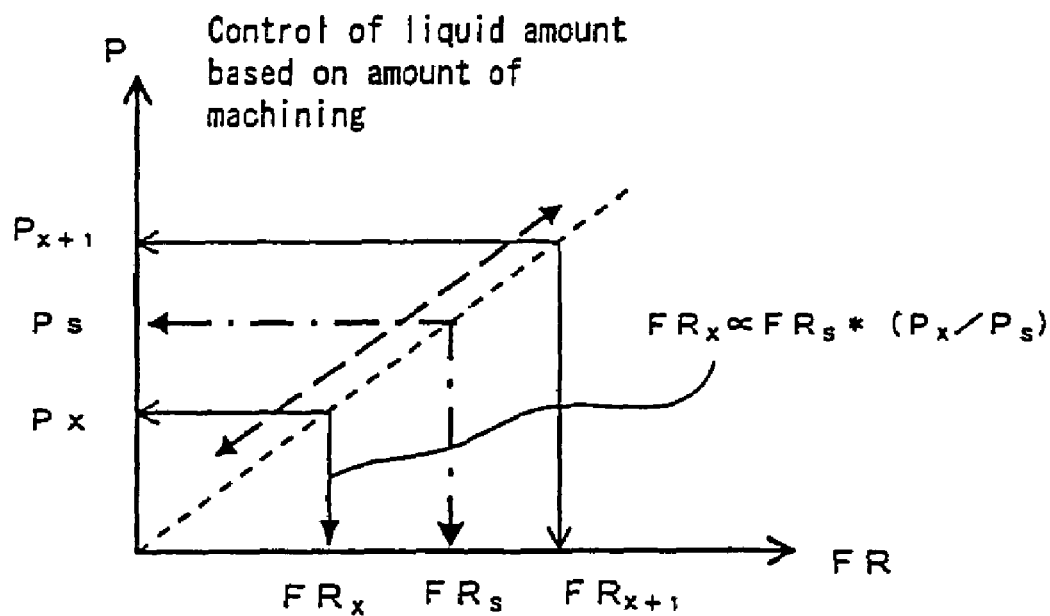
FIG. 12 is a view for explaining control of the liquid amount due to the change in the amount of machining.

FIGS. 11 and 12 are explanatory views for illustrating relationship between a state of machining and the amount of coolant. From this figure, the following relationship is established:

$$Ps \propto Qs/w \quad (30)$$

$$Px \propto Qx/w \quad (31)$$

$$Qx/FRx \propto Qs/FRs \quad (32)$$

where w is an amount of sludge per discharge pulse; Qs and Qx are amounts of sludge to be removed by the discharge pulse number Ps and Px; and FRs and FRx are amounts of liquid at the discharge pulse number Ps and Px respectively.

From the above described expressions (30), (31) and (32), the following expression is established:

$$FRx \propto FRs*(Px/Ps) \quad (33)$$

In other words, control of an amount of liquid in accordance with an amount of sludge can be achieved by making an evaluation function which will become a value obtained by multiplying a preset amount of liquid FRs which is used as a reference, by a ratio of the discharge pulse number Ps which is used as a reference to a discharge pulse number Px at a time of change so as to change an amount of liquid FRx.

In this respect, when changing an amount of liquid FRx on the basis of the expression (33), κ which has been determined in advance on the basis of various materials, plate thickness and diameter of the wire electrode can be used in the same manner as described above. That is, a discharge pulse number Ps (=κ*SPD) which is used as a reference is determined by multiplying the determined κ by the preset feed speed SPD, and using this discharge pulse number Ps, the expressions (33) will be operated.

Next, embodiments of the present invention are described on the basis of the principle of the present invention explained above.

Figure 18:
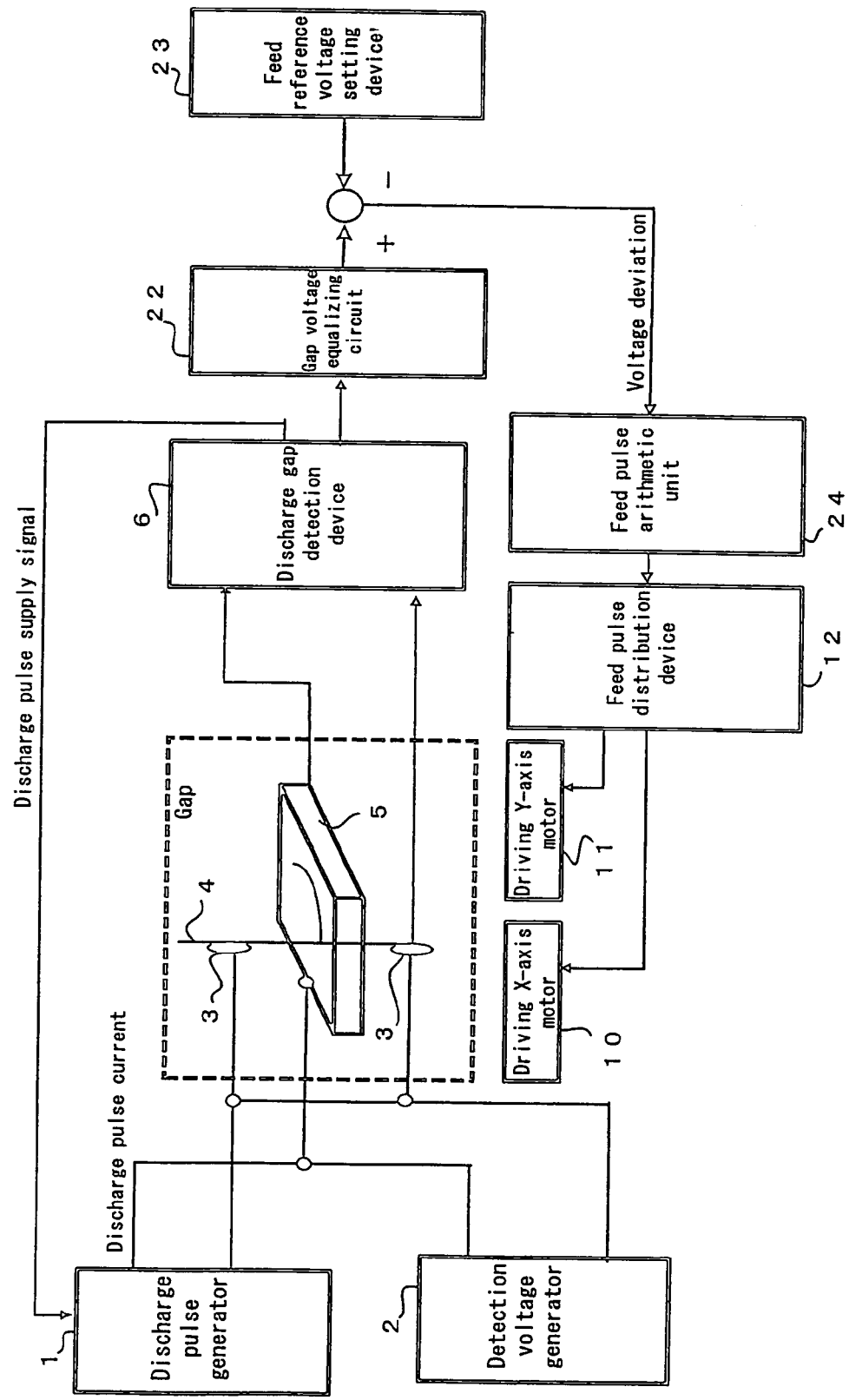
FIG. 18 is a block diagram showing an essential part of a conventional controller for electric discharge machine.
Figure 19:
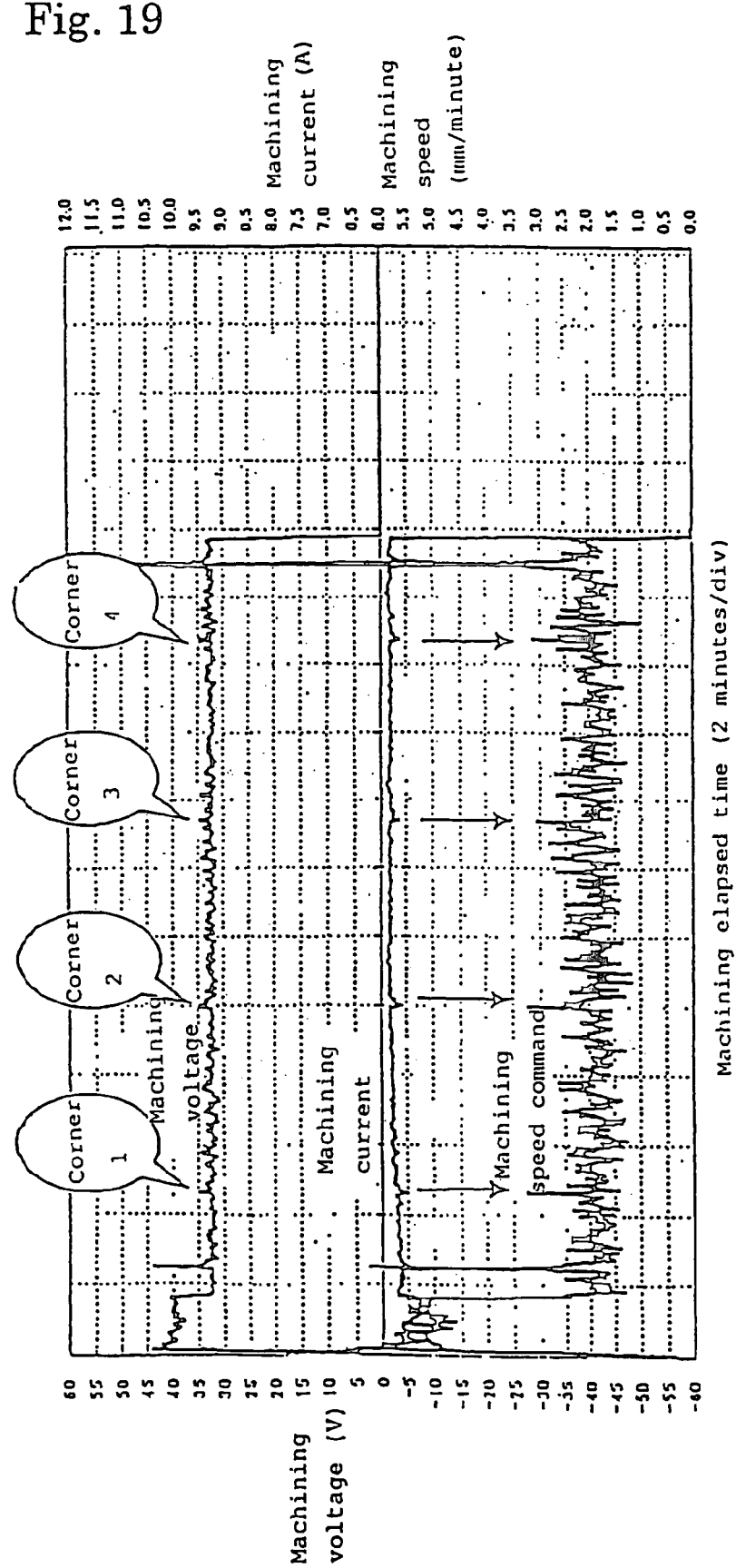
FIG. 19 is a monitored waveform for machining voltage, machining current, discharge pulse number, machining speed, and quiescent time when the shape of FIG. 13 has been machined by the conventional electric discharge machine.

An essential portion of a controller for a wire electric discharge machine according to a first embodiment of the present invention is described with reference to the block diagram of FIG. 1. In this respect, in FIG. 1, elements identical to those in the conventional example shown in FIG. 18 are designated by the identical reference numerals.

In FIG. 1, reference numeral 1 denotes a discharge pulse generator for generating discharge pulse current, composed of: a circuit composed of an active element such as a transistor for generating discharge pulse current; a charge/discharge circuit for a capacitor; a DC power source; and the like. One of the outputs from the discharge pulse generator 1 is connected to current-supply brushes 3 located up and down, while the other is connected to a workpiece 5, so that discharge pulse current is supplied between a wire electrode 4 traveling and the workpiece 5. Reference numeral 2 denotes a detection voltage generator composed of: a circuit consisting of an active element such as a transistor for developing detection voltage for detecting a state of the gap, resistor, a capacitor and the like; a DC power source; and the like. One of the outputs from a detection voltage generator 2 is connected to the workpiece 5, and the other is connected to the current-supply brushes 3 located up and down. A table (not shown) on which the workpiece 5 is mounted is controlled and driven by a X-axis driving motor controller 10, a Y-axis driving motor controller 11 and a feed pulse distribution device 12 which constitute moving means.

Reference numeral 6 denotes a discharge gap detection device for distinguishing whether or not a gap is in a dischargeable state in terms of detection voltage. One of the inputs to the discharge gap detection device 6 is connected to the workpiece 5, while the other is connected to the current-supply brushes 3 located up and down. Thus, when determined to be dischargeable, a discharge pulse supply signal is outputted to the discharge pulse generator 1. At the same time, it is also outputted to a discharge pulse number counting device 7.

On the basis of a signal outputted from an arithmetic clock 14 every unit time (predetermined period) T, the discharge pulse number counting device 7 counts a discharge pulse supply signal during the period, in other words, substantially counting electric discharge pulse generated between the wire electrode 4 and the workpiece 5.

Reference numeral 8 denotes a reference discharge pulse number memory device for storing a discharge pulse number Ps which is used as a reference to be inputted in advance. A discharge pulse number comparison judging device 9 compares, every unit time T, discharge pulse number Px which the discharge pulse number counting device 7 counted and stored every unit time T, with a reference discharge pulse number Ps which has been inputted from the reference discharge pulse number memory device 8 and stored in advance, to output a ratio (Px/Ps) of the discharge pulse number Px to the reference discharge pulse number Ps to a feed pulse arithmetic unit 13, a discharge quiescent time controller 16 and a liquid amount controller 17.

On the basis of a signal transmitted from the arithmetic clock 14 every predetermined period T, the feed pulse arithmetic unit 13 multiplies a distance (=SPD*T) to be determined from feed speed SPD transmitted from the feed speed setting means 15 and predetermined period T by the ratio (Px/Ps) of discharge pulse number Px to the reference discharge pulse number Ps transmitted from the discharge pulse number comparison judging device 9 to determine an amount of movement (distance) Δx. In other words, the expression (5) will be operated to determine an amount of movement Δx, and a pulse train corresponding to this amount of movement Δx is outputted to a feed pulse distribution device 12.

The feed pulse distribution device 12 distributes, from this pulse train, driving pulses for X-axis and Y-axis to an X-axis driving motor controller 10 and a Y-axis driving motor controller 11 in accordance with a machining program and drives the X-axis motor and the Y-axis motor for driving the table on which a workpiece has been mounted, respectively.

In accordance with the ratio (Px/Ps) outputted from the discharge pulse number comparison judging device 9, a discharge quiescent time controller 16 operates the expression (29) when Px≦Ps, or operates the expression (26) when Px>Ps, to determine a quiescent time Toff for outputting to the detection voltage generator 2. The detection voltage generator 2 will apply voltage between the wire electrode 4 and the workpiece 5 after this quiescent time Toff is elapsed. In this manner, discharge quiescent time is controlled on the basis of an evaluation function which has been set so as to restrain surplus supply of energy in advance.

Also, on the basis of the ratio (Px/Ps) of the discharge pulse number Px to the reference discharge pulse number Ps outputted from the discharge pulse number comparison judging device 9, a liquid amount controller 17 controls an amount of liquid according to such an evaluation function as is shown in expression (33).

As described above, on the basis of the ratio (Px/Ps) of discharge pulse number Px to the reference discharge pulse number Ps, and the like, a moving distance, a quiescent time and an amount of coolant are controlled every predetermined time, so that surplus supply of energy is restrained, whereby it is possible to improve machining accuracy as well as the machining speed.

Figure 2:
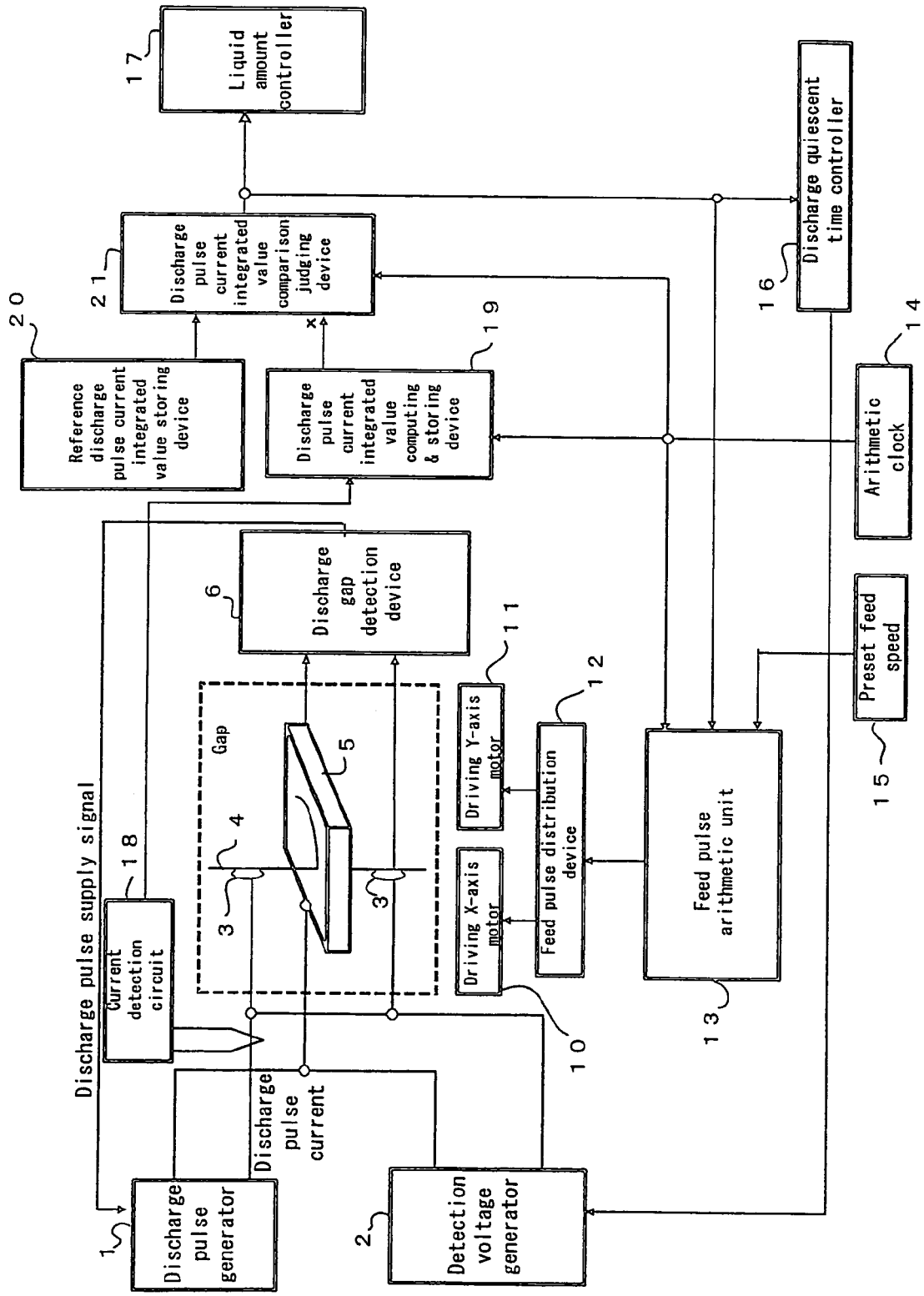
FIG. 2 is an essential block diagram showing a controller for a wire electric discharge machine according to a second embodiment of the present invention.

An essential portion of a controller for a wire discharge machine according to a second embodiment of the present invention is described with reference to the block diagram of FIG. 2. Here, only portions different from the first embodiment shown in FIG. 1 will be described.

In this second embodiment, integrated value of discharge pulse current is obtained by a current detection circuit 18 and a discharge pulse current integrated value computing and storing device 19, instead of counting and storing discharge pulse number, and a reference discharge pulse current integrated value storing device 20 is provided, instead of storing a reference discharge pulse number pulses. And, a discharge pulse current integrated value comparison judging circuit 21 obtains and outputs the ratio for controlling feed pulse, discharge quiescent time and amount of liquid.

That is, a discharge pulse current integrated value which is used as a reference can be set, instead of a discharge pulse number Ps which is used as a reference, and a discharge pulse current integrated value during machining can be obtained, instead of counting a discharge pulse Px per unit time T which changes every moment during machining. Also, in the same manner as in the case where κ is determined, values which are used as a reference may be obtained with respect to various materials, plate thickness and diameter of the wire electrode in advance respectively so that these values can be utilized.

The second embodiment is different from the first embodiment in that discharge pulse current integrated value is used in place of discharge pulse number, but is the same as the first embodiment in other respects including operation and effects.

Figure 14:
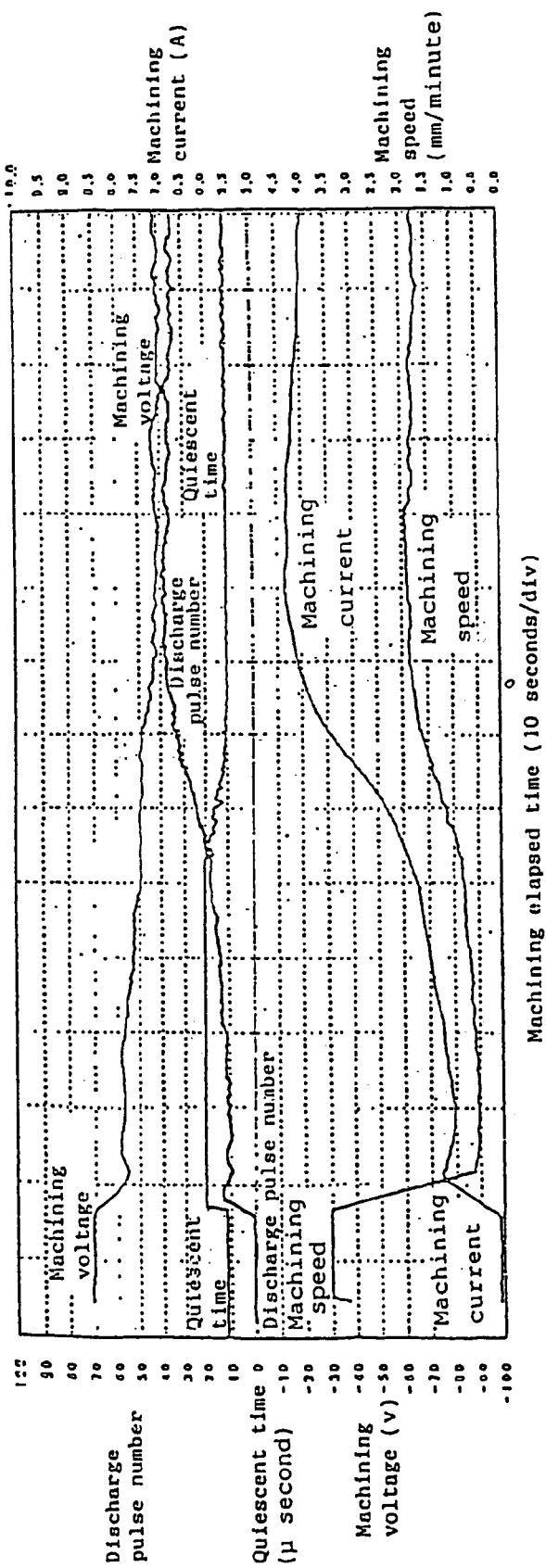
FIG. 14 is a monitored waveform for machining voltage, machining current, discharge pulse number, machining speed, and quiescent time immediately after commencement of machining when the shape of FIG. 13 has been machined.

FIG. 14 shows monitored waveforms when a cut has been made into a workpiece (material: SKD11) with plate thickness of 60 mm from the end surface using a wire electrode of φ0.2 mm (material: brass).

In FIG. 14, the abscissa represents machining elapsed time (10 seconds/division), the left-side ordinate represents machining voltage (V), quiescent time (μ second), and discharge pulse number per unit time, and the right-side ordinate represents machining speed (mm/minute) and machining current (A). Hereinafter, the description will be made in accordance with the time elapsed for machining.

Until lapse of 18 seconds since monitoring is started, the machining voltage remains at 70V, the quiescent time at 12μ second, the discharge pulse number at 0 level, the machining current at 0 A, and the machining speed at 3.5 mm/minute, and the machining feed is being performed in accordance with the conventional method. From lapse of 18 seconds to 20 seconds, the machining voltage lowers to 60V or less, and the machining current starts to flow. This point of time is detected to start feeding to which the present invention is applied. As an amount of machining increases, discharge pulse number also gradually increases correspondingly, and at the same time, the quiescent time gradually approaches to the preset quiescent time. The machining speed gradually increases from about 1 mm/minute, and reaches substantially the target machining performance level when 60 seconds are elapsed. From this result, it can be confirmed that disconnection based on concentrated electric discharge which causes a problem when making a cut into the end surface, insufficient amount of liquid to the discharged portion caused by escape of coolant and the like can be avoided.

Figure 13:
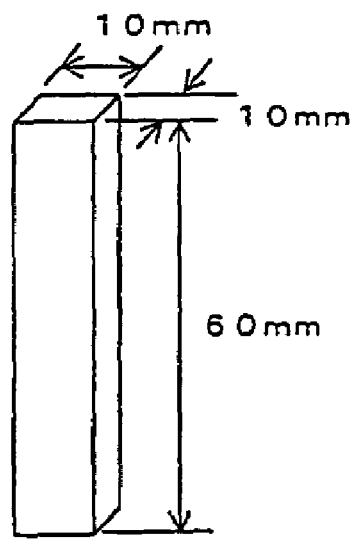
FIG. 13 shows a shape of the workpiece when monitored waveforms of FIGS. 14, 15 and 19 have been acquired.
Figure 15:
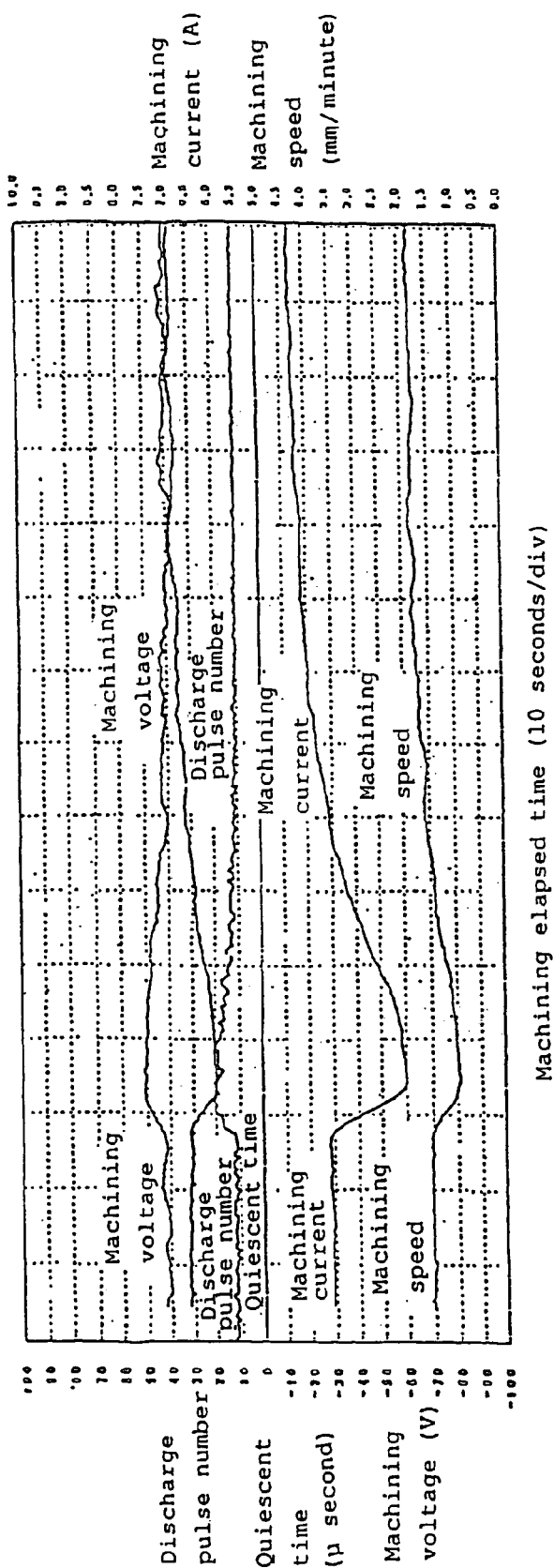
FIG. 15 is a monitored waveform for machining voltage, machining current, discharge pulse number, machining speed, and quiescent time immediately after the corner has been passed when the shape of FIG. 13 has been machined.

FIG. 15 shows monitored waveforms at the passage of the corner portion when a workpiece is cut out by machining into the shape as shown in FIG. 13. The wire electrode has φ0.2 mm (material: brass), and the workpiece has plate thickness of 60 mm (material: SKD11). In FIG. 15, the abscissa represents a machining elapsed time (10 seconds/division), the left-side ordinate represents machining voltage (V), quiescent time (μ second), and a discharge pulse number per unit time, and the right-side ordinate represents machining speed (mm/minute) and machining current (A). Hereinafter, the description will be made in accordance with the time elapsed for machining.

The waveforms show that the wire electrode does not reach the right angle corner until elapse of 26 seconds since monitoring is started. The machining voltage remains at about 42V, the quiescent time at about 12μ second, the discharge pulse number at about 30, the machining current at about 3.6 A, and the machining speed at about 1.5 mm/minute.

From the time when the electrode enters the right angle corner with the lapse of 26 seconds until the time when the electrode moves a distance corresponding to a gap width with the lapse of 32 seconds, the machining voltage remains at about 50V, the quiescent time at about 20μ second, the discharge pulse number at about 20, the machining current at about 2 A, and the machining speed at about 1 nm/minute, and the energy given is caused to lower.

Thereafter, the speed is gradually increased and, when about 60 seconds are elapsed, the machined state returns to the substantially same state as that in the portion immediately before the corner. It can be confirmed that problem at the corner which would occur in the case of prior art, that is, concentrated electric discharge due to an excessive feed and excessive energy supply, is avoided.

Figure 16:
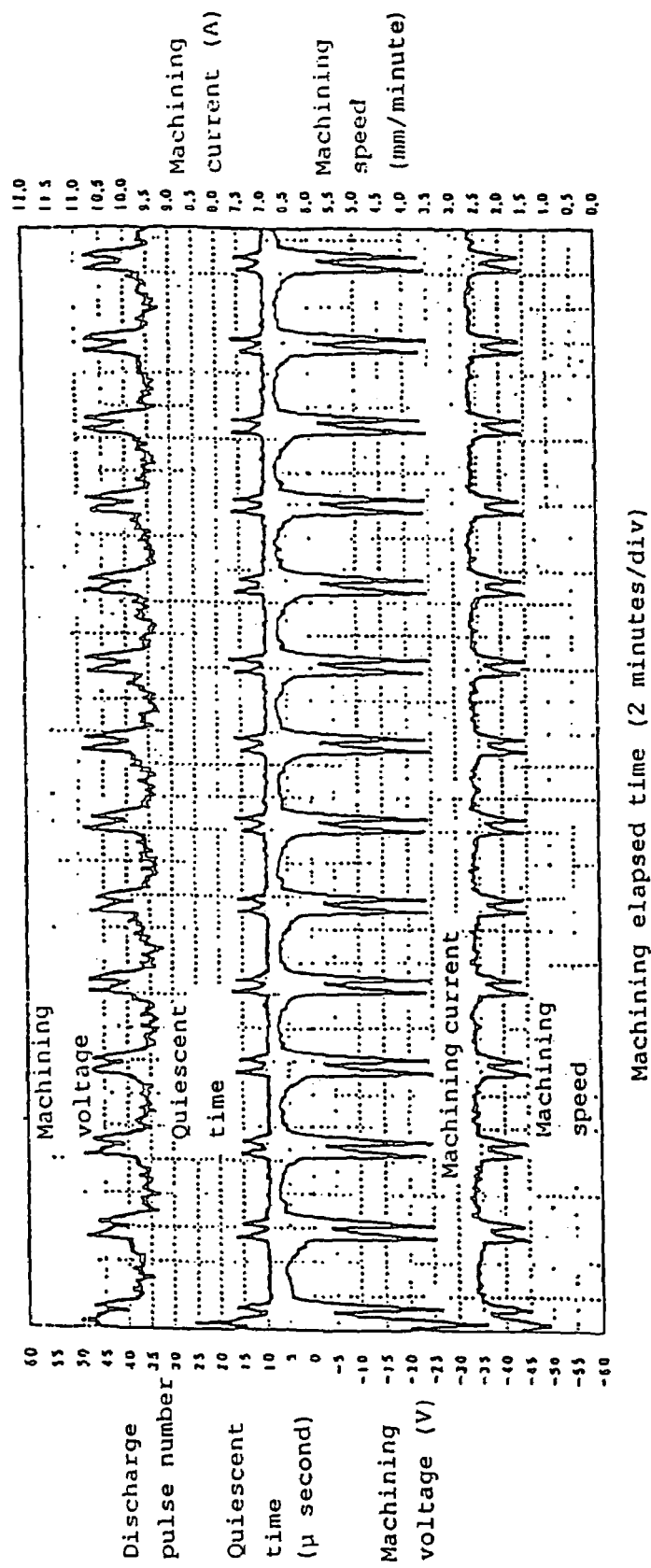
FIG. 16 is a monitored waveform for machining voltage, machining current, discharge pulse number, machining speed, and quiescent time when the shape of FIG. 17 has been machined.
Figure 17:
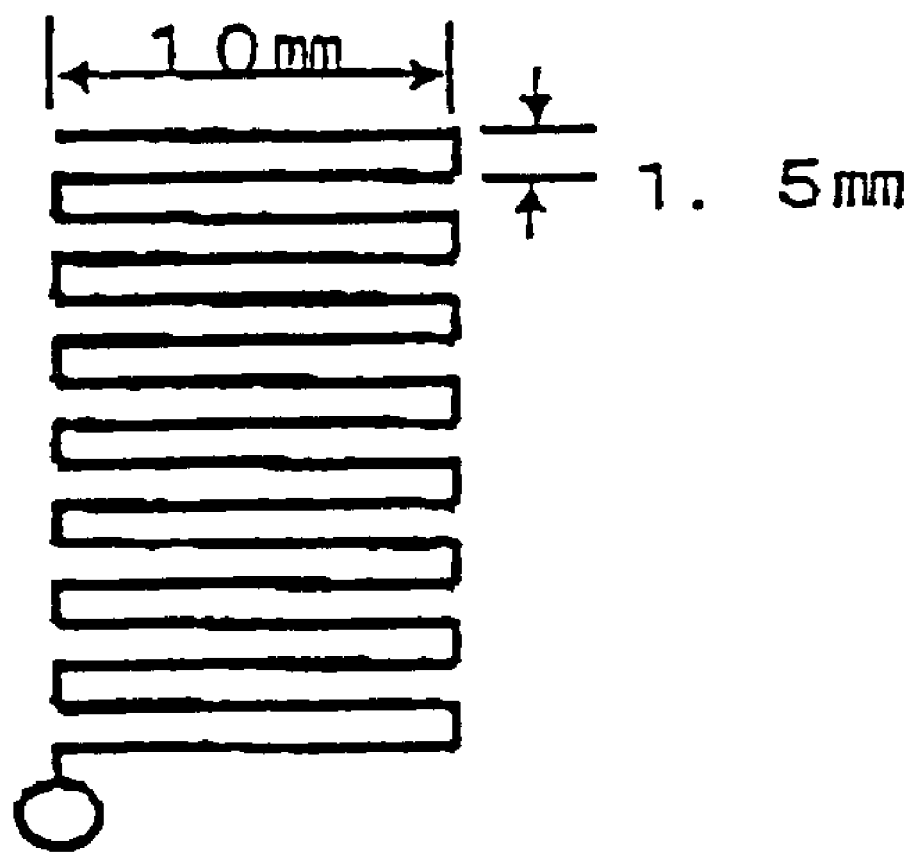
FIG. 17 is a view showing an example of the shape of machining.

FIG. 16 shows monitored waveforms which have been obtained by continuously machining a workpiece (material: die steel) with plate thickness of 60 mm in a zigzag shape having one side shown in FIG. 17 of 10 mm and a pitch of 1.5 mm over about one hour using a wire electrode of φ0.2 mm (material: brass) and monitoring a machining voltage, a machining current, a quiescent time and a machining speed. In FIG. 16, the abscissa represents time elapsed for machining (2 minutes/division), the left-side ordinate represents machining voltage (V) and quiescent time (μ second), and the right-side ordinate represents machining speed (mm/minute) and machining current (A).

The explanation of the waveforms will be made below in accordance with the elapse of machining time. Since the machining is started with cutting into an end surface, quiescent time is extended to about 20μ seconds by the control according to the present invention, and accordingly, machining current and machining speed are also controlled respectively. The machining speed becomes the largest at a point distant from the corner by about 5 mm. At that time, the machining voltage is about 35V, the quiescent time is about 10μ second, the machining current is about 6.7 A, and the machining speed is about 2.6 mm/minute. Immediately after the passage of the corner, the machining voltage rises to about 47V by the control according to the present invention, but the machining speed lowers to about 1.5 mm/minute, and the machining current lowers to about 3.6 A.

As described above, it has been confirmed that the machining over a long period of time according to the present invention could solve such a problem of prior art as disconnection immediately after cutting into an end surface of a workpiece and immediately after the passage of the corner.

Since machining feed corresponding to discharge pulse number can be realized according to the present invention, the following various effects are obtained:

1. It becomes possible to maintain an optimum machining current.

2. Wire disconnection which tends to occur when starting to cut, immediately after the passage of a corner and the like, in which an amount of machining varies, can be avoided.

3. Machining speed with high wire tensile force is increased to a large extent.

4. Machining precision at a corner portion is improved.

5. Variation in allowance for machining enlargement is reduced.

What is claimed is:

1. A controller for a wire electric discharge machine performing electric discharge machining by applying electric discharge pulse current between a wire electrode and a workpiece while said wire electrode and said workpiece are caused to relatively move to each other, comprising:
discharge pulse current integrated value computing means for computing to integrate discharge pulse current applied every predetermined time;
moving means for relatively moving said wire electrode and said workpiece to each other along a machining path on the basis of a moving command;
reference discharge pulse current integrated value memory means for storing a time integrated value for discharge pulse current which is used as a reference;
means for determining a ratio of a numerical value obtained by said discharge pulse current integrated value computing means to a numerical value stored in said reference discharge pulse current integrated value memory means; and
means for outputting, to said moving means, distance obtained by multiplying relative moving distance between said wire electrode and said workpiece to be determined by preset feed speed and said predetermined time by said ratio as a moving command every said predetermined time.

2. A controller for a wire electric discharge machine performing electric discharge machining by applying electric discharge pulse current between a wire electrode and a workpiece while said wire electrode and said workpiece are caused to relatively move to each other, comprising:
discharge pulse current integrated value computing means for computing to integrate discharge pulse current applied every predetermined time;
moving means for relatively moving said wire electrode and said workpiece to each other along a machining path on the basis of a moving command;
reference discharge pulse current integrated value memory means for storing a time integrated value for discharge pulse current which is used as a reference;
means for comparing a numerical value obtained by said discharge pulse current integrated value computing means every predetermined time with a numerical value stored in said reference discharge pulse current integrated value memory means; and
a quiescent time controller for controlling discharge quiescent time so as to restrain surplus supply of energy in accordance with said comparison result.

3. A controller for a wire electric discharge machine performing electric discharge machining by applying electric discharge pulse current between a wire electrode and a workpiece while said wire electrode and said workpiece are being caused to relatively move to each other, comprising:
discharge pulse current integrated value computing means for computing to integrate discharge pulse current applied every predetermined time;
moving means for relatively moving said wire electrode and said workpiece to each other along a machining path on the basis of a moving command;
reference discharge pulse current integrated value memory means for storing a time integrated value for discharge pulse current which is used as a reference;
means for determining a ratio of a numerical value obtained by said discharge pulse current integrated value computing means every predetermined time to a numerical value stored in said reference discharge pulse current integrated value memory means; and
a liquid amount controller adapted to increase or decrease an amount of coolant in accordance with said ratio.

4. A controller for a wire electric discharge machine performing electric discharge machining by applying electric discharge pulse current between a wire electrode and a workpiece while said wire electrode and said workpiece are caused to relatively move to each other, comprising:
discharge pulse current integrated value computing means for computing to integrate discharge pulse current applied every predetermined time;
moving means for relatively moving said wire electrode and said workpiece along a machining path on the basis of a moving command;
reference discharge pulse current integrated value memory means for storing a time integrated value for discharge pulse current which is used as a reference; and
comparison means for comparing a numerical value obtained by said discharge pulse current integrated value computing means every predetermined time with a numerical value stored in said reference discharge pulse current integrated value memory means; wherein
on the basis of the comparison result by said comparison means, discharge quiescent time is controlled and an amount of movement every said predetermined time in a moving command to be outputted to said moving means is controlled.

* * * * *

UNITED STATES PATENT AND TRADEMARK OFFICE
CERTIFICATE OF CORRECTION

| | | |
|---|---|---|
| PATENT NO. | : 7,019,246 B2 | Page 1 of 1 |
| APPLICATION NO. | : 11/195595 | |
| DATED | : March 28, 2006 | |
| INVENTOR(S) | : Masaki Kurihara et al. | |

It is certified that error appears in the above-identified patent and that said Letters Patent is hereby corrected as shown below:

On Title Page, item (56) References Cited, Other Publications:

Column 2, line 2, change "appliation" to --application--

Column 2, line 4, change "Hubh" to --Hugh--

In the drawings:

Sheet 4, Fig. 4, line 7, change "moveable" to --movable--

Sheet 6, Fig. 6B, change "$P_x$ : Discharge pule number per unit time T" to --$P_x$ : Discharge pulse number per unit time T--

Sheet 10, Fig. 10, item (b), line 2, change "wavefotm" to --waveform--

Sheet 11, Fig. 11, below box 5, change "Dirction" to --Direction--

Column 1, line 6, change "2001," to --2001, pending,--

Column 5, line 24, change "Ax*t*g" to --$\Delta$x*t*g--

Column 6, line 33, change "(2)" to --(2).--

Signed and Sealed this

Nineteenth Day of September, 2006

JON W. DUDAS
*Director of the United States Patent and Trademark Office*